(12) United States Patent
Kolay et al.

(10) Patent No.: US 12,258,218 B2
(45) Date of Patent: Mar. 25, 2025

(54) TAPER CONVERTIBLE MOTORIZED CONVEYOR ROLLERS

(71) Applicant: Intelligrated Headquarters, LLC, Mason, OH (US)

(72) Inventors: Abhishek Kolay, Howrah (IN); Ravi Kumar Avupati, Hyderabad (IN); Saravanan Sadasivan, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 18/641,505

(22) Filed: Apr. 22, 2024

(65) Prior Publication Data
US 2024/0262634 A1    Aug. 8, 2024

Related U.S. Application Data

(63) Continuation of application No. 17/860,338, filed on Jul. 8, 2022, now Pat. No. 11,993,462.

(51) Int. Cl.
| | |
|---|---|
| *B65G 13/02* | (2006.01) |
| *B65G 13/12* | (2006.01) |
| *B65G 39/07* | (2006.01) |
| *B65G 39/18* | (2006.01) |

(52) U.S. Cl.
CPC ............ *B65G 39/18* (2013.01); *B65G 13/02* (2013.01); *B65G 39/07* (2013.01)

(58) Field of Classification Search
CPC ........ B65G 13/02; B65G 13/12; B65G 39/07; B65G 39/18
USPC .................................. 198/782, 370.2; 193/37
See application file for complete search history.

(56) References Cited

U.S. PATENT DOCUMENTS

| | | | |
|---|---|---|---|
| 3,807,546 A | * | 4/1974 | Canonaco ............. C03B 35/181 198/780 |
| 3,904,144 A | | 9/1975 | Gattrugeri |
| 5,101,215 A | | 3/1992 | Creaser, Jr. |
| 5,315,795 A | | 5/1994 | Chae et al. |
| 5,372,331 A | | 12/1994 | Miller et al. |

(Continued)

FOREIGN PATENT DOCUMENTS

CN        204400035 U      6/2015

OTHER PUBLICATIONS

Non-Final Rejection Mailed on Nov. 17, 2023 for U.S. Appl. No. 17/860,338, 8 page(s).

(Continued)

*Primary Examiner* — Douglas A Hess
(74) *Attorney, Agent, or Firm* — Alston & Bird LLP

(57) ABSTRACT

Apparatuses, methods, and systems comprising reconfigurable motorized conveyor rollers are provided. The example reconfigurable motorized conveyor roller includes a housing with a first end and a second end opposite to the first end. The housing includes a plurality of curved plates that at least partially form a cylindrical tube. The reconfigurable motorized conveyor roller includes a motor assembly and a drive assembly at least partially disposed within the housing that are configured to cause rotation of at least a portion of the reconfigurable motorized conveyor roller. And, the reconfigurable motorized conveyor roller includes a housing adjustment assembly disposed within the housing that is operable to modify one or more dimensions of the housing.

19 Claims, 15 Drawing Sheets

(56) References Cited

U.S. PATENT DOCUMENTS

| | | | |
|---|---|---|---|
| 5,379,964 A | 1/1995 | Pretto et al. | |
| 5,597,134 A | 1/1997 | Marin | |
| 5,746,387 A | 5/1998 | Pretto et al. | |
| 6,065,715 A | 5/2000 | Andersson | |
| 6,571,682 B2 | 6/2003 | Roberts et al. | |
| 7,252,261 B2 | 8/2007 | Rollins et al. | |
| 7,299,589 B2 | 11/2007 | Campbell et al. | |
| 7,645,222 B2 | 1/2010 | Biagiotti et al. | |
| 7,896,048 B2 | 3/2011 | Serdarevic et al. | |
| 8,453,931 B2 | 6/2013 | Chiou et al. | |
| 8,794,423 B2 | 8/2014 | Sasstamo et al. | |
| 8,869,965 B2 | 10/2014 | She | |
| 9,493,310 B2 * | 11/2016 | Dudek | B65G 39/02 |
| 10,759,611 B1 | 9/2020 | Kalm | |
| 11,891,252 B1 * | 2/2024 | Ahlquist | B65G 39/07 |
| 11,993,462 B2 | 5/2024 | Kolay et al. | |
| 2002/0056609 A1 | 5/2002 | Nakamura et al. | |

OTHER PUBLICATIONS

Notice of Allowance and Fees Due (PTOL-85) Mailed on Jan. 23, 2024 for U.S. Appl. No. 17/860,338, 5 page(s).

\* cited by examiner

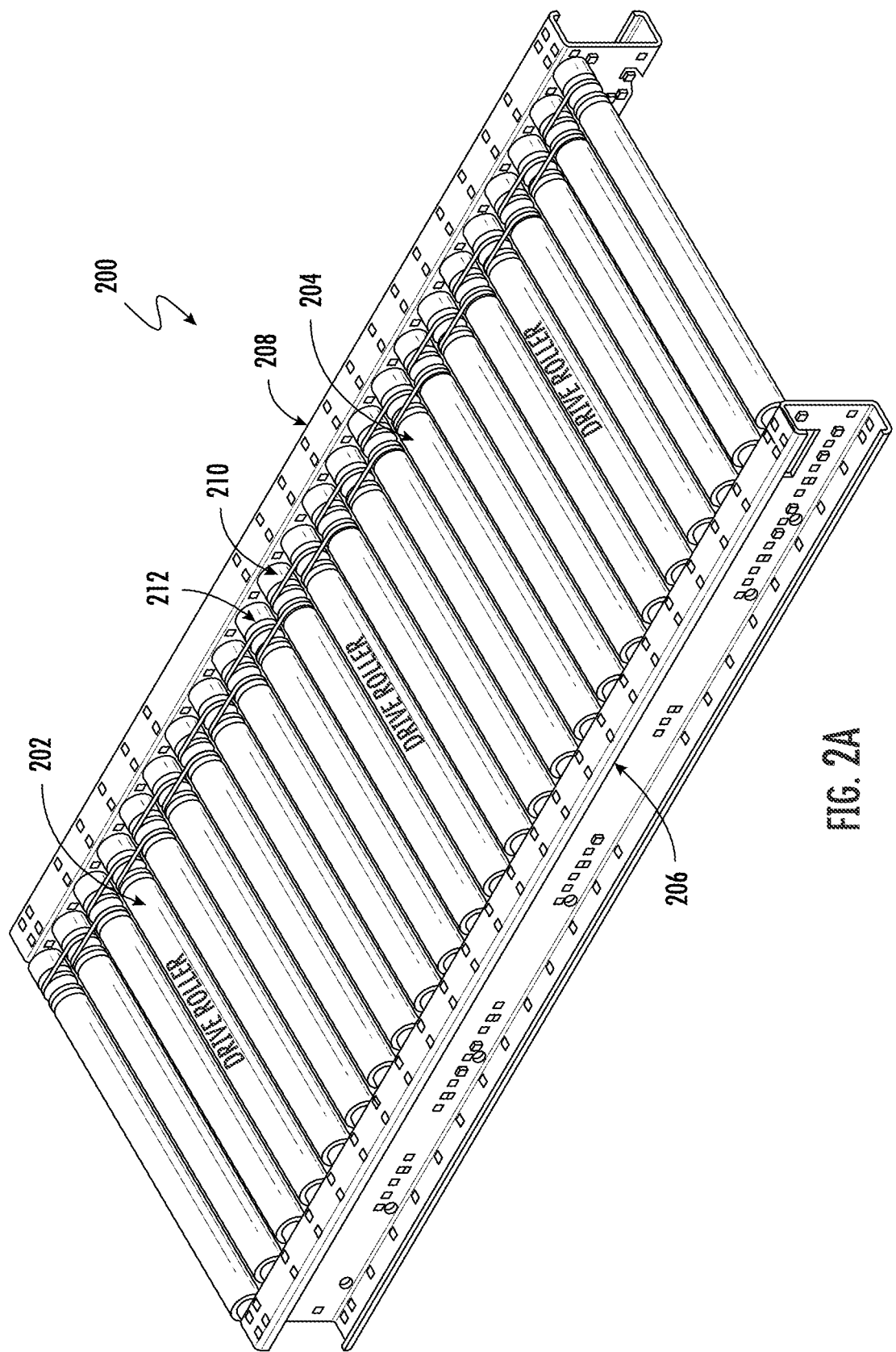

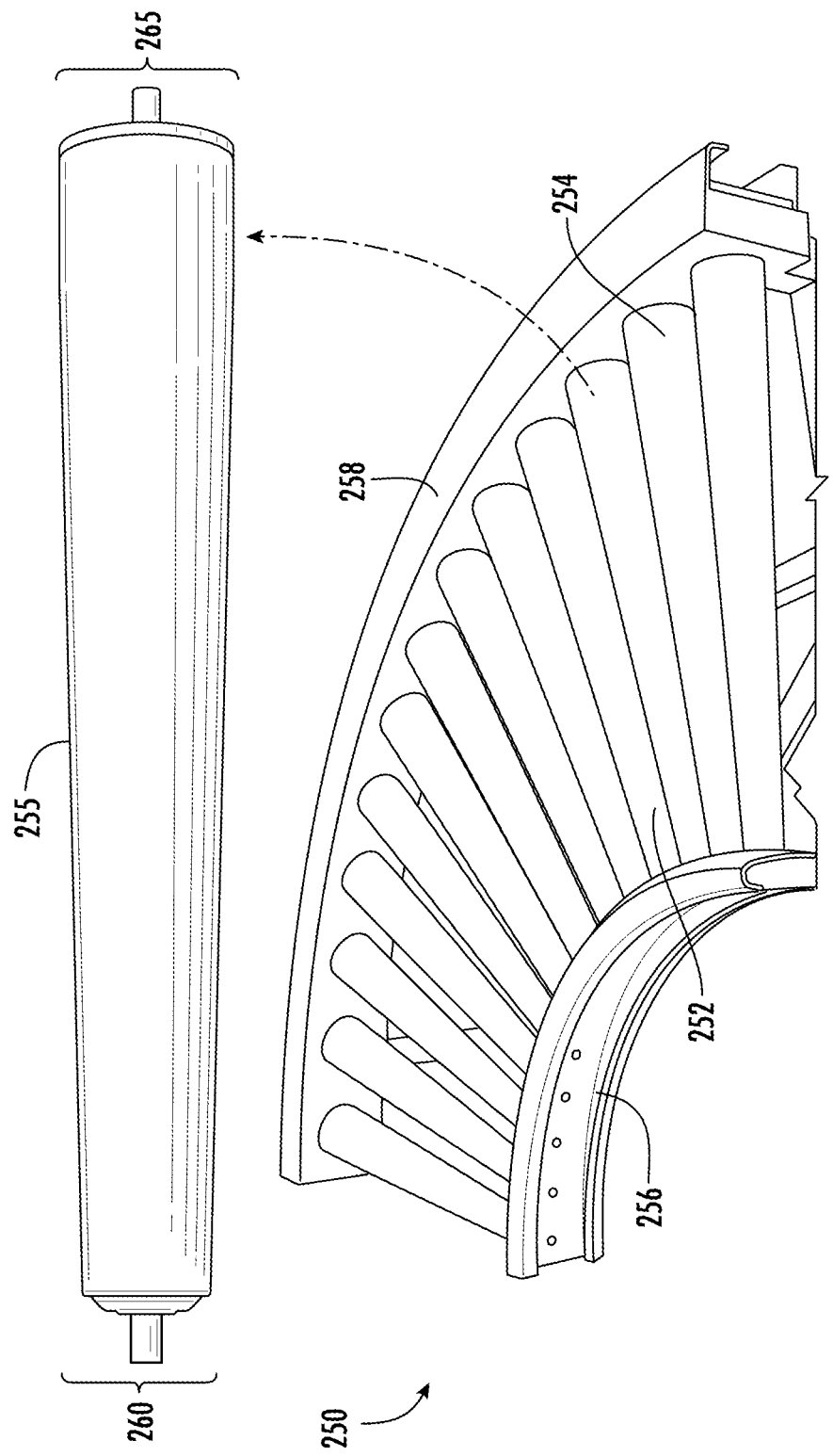

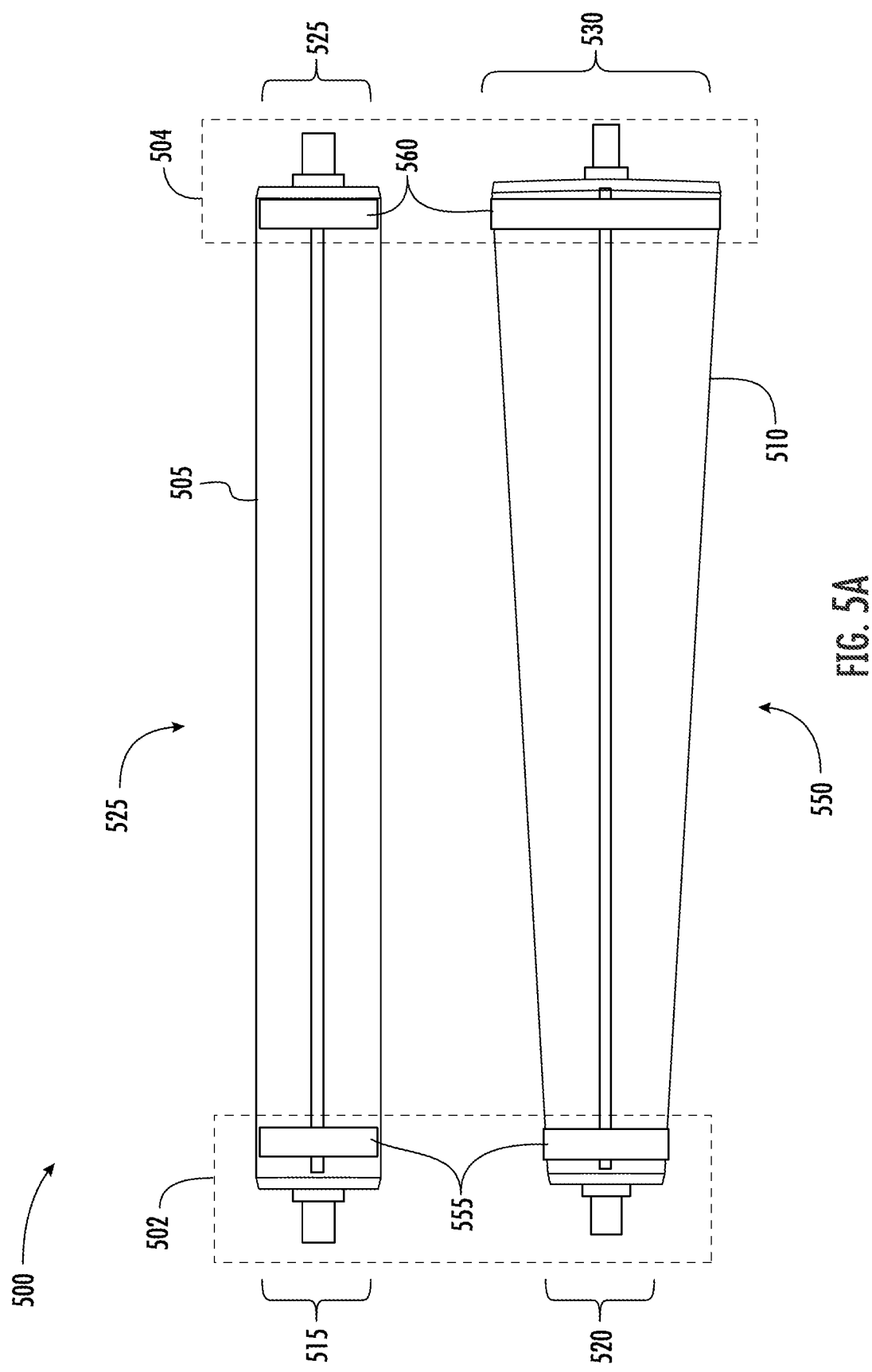

TAPER CONVERTIBLE MOTORIZED CONVEYOR ROLLERS

CROSS REFERENCE TO RELATED APPLICATIONS

This application is a continuation of U.S. application Ser. No. 17/860,338, entitled "TAPER CONVERTIBLE MOTORIZED CONVEYOR ROLLERS," filed Jul. 8, 2022, the contents of which are incorporated herein by reference in its entirety.

BACKGROUND

The present disclosure relates in general to a reconfigurable motorized conveyor roller for a conveyor system. Many rotating apparatuses and devices for conveyor systems are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems comprising reconfigurable motorized conveyor rollers.

In accordance with various examples of the present disclosure, a reconfigurable motorized conveyor roller is provided. The reconfigurable motorized conveyor roller comprises: a housing comprising a first end and a second end opposite to the first end, wherein the housing comprises a plurality of curved plates that at least partially form a cylindrical tube; a motor assembly and a drive assembly at least partially disposed within the housing that are configured to cause rotation of at least a portion of the reconfigurable motorized conveyor roller; and a housing adjustment assembly disposed within the housing that is operable to modify one or more dimensions of the housing.

In some embodiments, the housing adjustment assembly is disposed proximate to the second end and is operable to increase a diameter of the housing at the second end to form a tapered housing.

In some embodiments, the housing adjustment assembly is disposed proximate to the second end and is operable to decrease a diameter of the housing at the second end to form a straight housing.

In some embodiments, the housing adjustment assembly comprises a cam slotted gear and a drive gear, and wherein a curved plate of the housing comprises a plate rod that is attached to a cam slot of the cam slotted gear.

In some embodiments, the drive gear is configured to cause rotation of the cam slotted gear to increase or decrease a diameter of the at least a portion of the housing.

In some embodiments, the drive gear is operatively coupled to the motor assembly, wherein the motor assembly is configured to rotate the drive gear to cause the rotation of the cam slotted gear.

In some embodiments, the reconfigurable motorized conveyor roller comprises: a controller component in electronic communication with the motor assembly, the drive assembly, and the housing adjustment assembly. The controller component is configured to cause a rotation the drive gear responsive to an input.

In some embodiments, the reconfigurable motorized conveyor roller comprises an integrated shoe sorter assembly. The integrated shoe assembly comprises a shoe slider component at least partially disposed on an exterior surface of the housing; and a shoe adjustment component disposed within the housing that is operable to modify a position of the shoe slider component relative to the housing.

In some embodiments, shoe slider component is moveable between the first end and the second end of the housing.

In some embodiments, the shoe slider component comprises an exterior ring that encircles the exterior surface of the housing.

In some embodiments, the housing comprises a surface gap between at least two of the plurality of curved plates. The exterior ring comprises a prominence fitted within the surface gap.

In some embodiments, the shoe adjustment component is attached by a connecting link to the prominence fitted within the surface gap.

In some embodiments, the shoe adjustment component comprises a lead screw extending along the length of the housing and a nut coupled to the lead screw.

In some embodiments, the shoe slider component is attached to the nut.

In some embodiments, rotation of the lead screw causes the nut to move in a direction relative to the length of the housing.

In some embodiments, the lead screw is operatively coupled to the motor assembly, wherein the motor assembly is configured to rotate the lead screw to cause the nut to move.

In some embodiments, the lead screw is rotated independent of the housing.

In some embodiments, reconfigurable motorized conveyor roller comprises a controller component in electronic communication with the motor assembly, the drive assembly, and the integrated shoe sorter assembly. The controller component is configured to cause the rotation of the lead screw.

In accordance with various examples of the present disclosure, a method is provided. The method comprises receiving, by a controller component of a reconfigurable motorized conveyor roller ("RMCR"), configuration data from a computing entity in electronic communication with the controller component. The method comprises causing, by the controller component and based at least in part on the configuration data, a rotation of at least one of: (i) at least a portion of a housing adjustment assembly of the RMCR to modify one or more dimensions of a housing of the RMCR, or (ii) at least a portion of an integrated shoe sorter assembly of the RMCR to cause a movement of a shoe slider component along an exterior of the housing of the RMCR.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale, unless described otherwise. For example, the dimensions of some of the elements can be exaggerated relative to other elements, unless described otherwise.

Embodiments incorporating teachings of the present disclosure are shown and described with respect to the figures presented herein, in which:

FIG. 2A illustrates an example straight-line portion of a conveyor bed with motorized and non-motorized straight rollers, in accordance with various embodiments of the present disclosure;

FIG. 2B illustrates an example curved portion of a conveyor bed with motorized and non-motorized tapered rollers, in accordance with various embodiments of the present disclosure;

FIG. 5A illustrates an example reconfigurable motorized conveyor roller in accordance with various embodiments of the present disclosure;

DETAILED DESCRIPTION OF THE INVENTION

Figure 1:
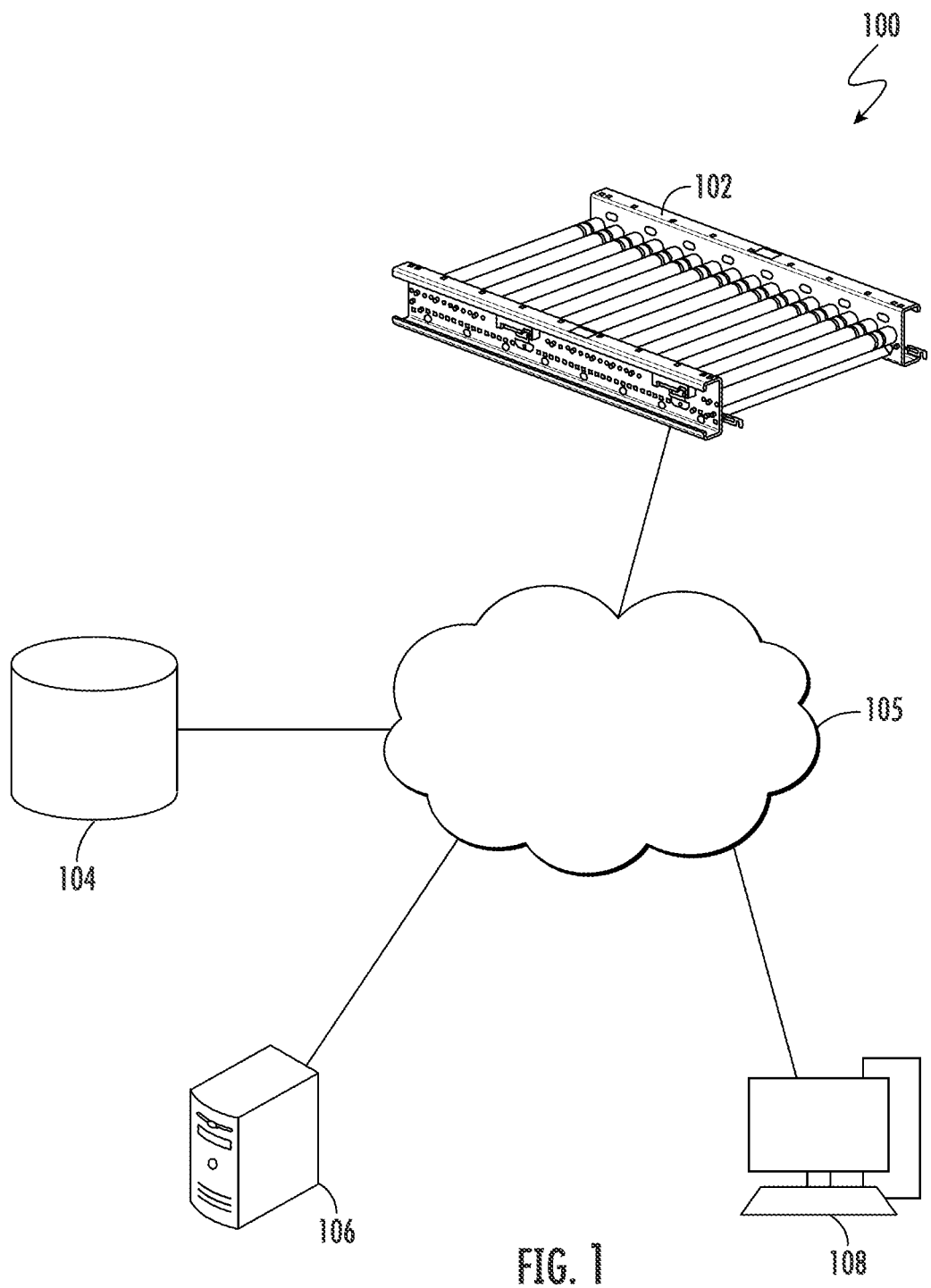
FIG. 1 illustrates an example of a system in accordance with various embodiments of the present disclosure.

Some embodiments of the present disclosure will now be described more fully hereinafter with reference to the accompanying drawings, in which some, but not all embodiments of the disclosure are shown. Indeed, these disclosures can be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that can or can not be present in various embodiments of the present disclosure described herein such that embodiments can include fewer or more components than those shown in the figures while not departing from the scope of the present disclosure. Some components can be omitted from one or more figures or shown in dashed line for visibility of the underlying components.

The phrases "in an example embodiment," "some embodiments," "various embodiments," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other embodiments.

If the specification states a component or feature "can," "can," "could," "should," "would," "preferably," "possibly," "typically," "optionally," "for example," "often," or "might" (or other such language) be included or have a characteristic, that a specific component or feature is not required to be included or to have the characteristic. Such components or features can be optionally included in some embodiments, or can be excluded.

The term "electronically coupled" or "in electronic communication with" in the present disclosure can refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) can be transmitted to and/or received from the electrical elements and/or electric circuit(s) that are electronically coupled.

The terms "conveyor," "conveyor section," "conveyor bed," "conveyor assembly" or "conveyor system," and similar terms are used interchangeably herein to refer to an apparatus that is configured to convey objects or articles within a material handling system in accordance with embodiments of the present disclosure. A motorized conveyor roller according to some embodiments discussed herein can comprise a plurality of drive components including a motor assembly and a drive assembly which operate to drive a housing (e.g., roller tube). These assemblies can have one or more components that are arranged in various configurations within an inner portion of the motorized conveyor roller. In some embodiments, the drive assembly can be fixed relative to the housing (e.g., roller tube), while the motor assembly is fixed relative to a frame supporting the roller tube, such that the motor assembly can be configured to rotate the drive assembly and roller tube.

In some embodiments, motorized rollers can be utilized in conveyers with different section shapes including, for example, one or more curved sections and straight-line sections. At a curved section of a conveyer frame, a motorized roller can have a first diameter at an outside edge of a conveyer frame and taper towards a second diameter at an inside edge of the conveyer frame to help items maintain their position on the conveyor as they are moved around the curved section. At a non-curved, straight-line section, of the conveyer frame, a motorized roller can have a first diameter at the outside edge and the inside edge of the conveyer frame. To accommodate for the differences in roller diameters for curved and straight-line sections of a conveyor, different types of motorized rollers can be used at each section. For instance, a tapered motorized roller with a first diameter at a first edge and a second, different diameter at a second edge of the roller can be used to form, at least in part, a curved section of a conveyor, whereas a non-tapered motorized roller with first diameter at a first edge and a second edge of the roller can be used to form, at least in part, a straight-line, non-curved section of the conveyer. This results in fixed conveyor setups with undesirable flexibility and requires maintaining multiple stock keeping units, tooling, assembly setups, and inventory of such difference motorized rollers.

Additionally, motorized rollers can include shoe sorters to sort items as the items are moved along a conveyor section. Shoe sorters are typically independently configured for a section of a conveyor and require specific expertise to maintain. Moreover, shoe sorters are only compatible for certain motorized or non-motorized rollers which further reduces the flexibly of conventional conveyor setups and requires further maintenance of stock keeping units, tooling, assembly setups, and inventory.

In accordance with various embodiments of the present disclosure, example methods, apparatuses, computer program products and systems are provided that, in some examples provide a motorized roller design that can be reconfigured between tapered and straight configurations and/or inbuilt shoe sorters in motorized rollers.

For example, the present disclosure can provide a reconfigurable motorized conveyor roller including a housing with a first end and a second end opposite to the first end. The housing can include a plurality of curved plates that at least partially form a cylindrical tube. The reconfigurable motorized conveyor roller can include a motor assembly and a drive assembly at least partially disposed within the housing that are configured to cause rotation of at least a portion of the integrated motorized conveyor roller. The reconfigurable motorized conveyor roller can include a housing adjustment assembly disposed within the housing that is operable to modify one or more dimensions of the housing.

In addition, or alternatively, the reconfigurable motorized conveyor roller can include an integrated shoe sorter assembly that includes a shoe slider component at least partially disposed on an exterior surface of the housing and a shoe adjustment component disposed within the housing that is operable to modify a position of the shoe slider component relative to the housing.

As such, the present disclosure provides a reconfigurable motorized conveyor roller that includes a flexible design for configuring straight, curved, and right-angle conveyer sections. The flexible design can be utilized, in some examples, to dynamically ease belt tracking and tightening problems found in conventional motorized and non-motorized rollers. Moreover, the reconfigurable motorized conveyor roller of the present disclosure allows for dynamic diversion of items as well as efficient packet switching using inbuilt shoe sorters. This enables minimization of stock keeping units, and reduces costs associated with making multiple designs, and maintaining multiple separate tooling, assembly setups, and inventory.

Referring now to FIG. 1, a schematic diagram depicting an example system 100 in accordance various embodiments of the present disclosure is provided. As depicted, the example system 100 includes a conveyor 102 comprising one or more motorized conveyor rollers, one or more computing entities 106 (e.g., servers), one or more databases 104, one or more networks 105, one or more user computing entities 108, and/or the like. In various examples, the system 100 can operate to convey objects within a particular location or environment.

In various embodiments, the conveyor 102 can be configured to transport objects within a particular location or environment utilizing one or more motorized conveyor rollers. In some embodiments, the conveyor 102 includes one or more motorized conveyor rollers, the one or more computing entities 106, the one or more databases 104 and/or the one or more user computing entities 108 are in electronic communication with each other over the one or more networks 105 such that they can exchange data (e.g., receive and transmit data) with one another (e.g., periodically and/or in response to requests). Each of the components of the system 100 can be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 100 includes one or more computing entities 106. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 106 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 106 with the assistance of the processing element and the operating system.

As indicated, in one embodiment, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components can be located remotely from other computing entity 106 components, such as in a distributed system. Furthermore, one or more of the components can be aggregated and additional components performing functions described herein can be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 includes a user computing entity 108. In various embodiments, the user computing entity 108 can be or include one or more mobile devices, wearable computing devices, and/or the like. An example user computing entity 108 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 108 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 108 can be capable of operating with one or more air interface standards, communication protocols, modulation types, and access types. More particularly, the user computing entity 108 can operate in accordance with any of a number of wireless communication standards and protocols. In a particular embodiment, the user computing entity 108 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 108 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 can include location determining aspects, devices, modules, functionalities, and/or similar words used herein interchangeably to acquire location information/data regularly, continuously, or in response to certain triggers.

The user computing entity 108 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can include or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 can be configured to communicate with one another via one or more networks 105. The networks 105 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 can have any suitable communication range associated therewith and can include, for example, global networks (e.g., the Internet), MANs, WANs, LANs, or PANs. In addition, the networks 105 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 can include one or more additional and/or alternative elements, and/or can be different from that illustrated in FIG. 1.

Referring now to FIG. 2A, a schematic diagram depicting an example straight line portion 225 of a conveyor 200 with motorized and non-motorized conveyor rollers in accordance with various embodiments of the present disclosure is provided. In some embodiments, the example portion of a conveyor 200 can define a particular section or zone of a conveyor system.

As depicted in FIG. 2A, the example conveyor 200 can include one or more motorized conveyor rollers, e.g., motorized conveyor roller 202, and one or more non-motorized conveyor rollers, e.g., non-motorized conveyor roller 204. In some embodiments, the conveyor 200 can include at least a first rail 206 and a second rail 208. As depicted in FIG. 2, the plurality of motorized conveyor rollers and non-motorized conveyor rollers (e.g., motorized conveyor roller 202 and non-motorized conveyor roller 204) are mechanically/operatively coupled to the first rail 206 and the second rail 208. In some embodiments, the first rail 206 and the second rail 208 can include one or more sets of apertures configured to receive the plurality of motorized conveyor rollers and non-motorized conveyor rollers (e.g., motorized conveyor roller 202 and non-motorized conveyor roller 204).

In some embodiments, as depicted in FIG. 2A, the non-motorized conveyor rollers (e.g., non-motorized conveyor roller 204) can be or include idler rollers or driven rollers. Additionally, the motorized conveyor rollers (e.g., motorized conveyor roller 202) can be or comprise drive rollers. In various embodiments, the motorized conveyor rollers/drive rollers are configured to drive the non-motorized conveyor rollers/idler rollers. For example, the motorized conveyor rollers/drive rollers can include drive bands, e.g., drive band 210. The example drive bands can comprise O-drive bands to drive the non-motorized conveyor rollers/idler rollers. As depicted in FIG. 2, in some examples, the motorized conveyor rollers/drive rollers and the non-motorized conveyor roller/idler rollers are connected to each other through a series of drive bands, e.g., drive band 210, in order to drive the non-motorized conveyor rollers/idler rollers. As further depicted, each of the drive bands, e.g., drive band 210, is reeved around a tracking ring, e.g., tracking ring 212, provided on the motorized conveyor rollers/drive rollers and the non-motorized conveyor rollers/idler rollers. The example tracking ring 212 can operate to ensure that the drive band 210 does not slip out of the drive rollers and the idler rollers when operating at full speed. The example drive band 210 can be connected to idler pulleys provided on/attached to either the first rail 206 or the second rail 208 of the conveyor 200 to maintain a target tension between the example drive band 210 and the motorized conveyor rollers/drive rollers and the non-motorized conveyor rollers/idler rollers (e.g., motorized conveyor roller 202 and non-motorized conveyor roller 204).

FIG. 2A one example portion 225 of the conveyor 200. The conveyer 200 can include a plurality of different portions, each including a plurality of motorized and/or non-motorized conveyor rollers. The example portion 225 can be configured as a straight, non-curved section of the conveyer 200 in the which the first rail 206 and the second rail 208 include straight and/or semi-straight rails. In some embodiments, each of the conveyor rollers (e.g., motorized conveyor roller 202, non-motorized conveyor rollers 204, etc.) used in a straight, non-curved section of the conveyer can include a constant diameter at each end of the respective conveyor rollers. For instance, the motorized conveyor roller 202 and the non-motorized roller 204 can include a first end with a first dimension and a second end opposite to the first end with the same first dimension. As one example, the first end and the second end of a straight conveyer roller can include a common diameter such as, for example, one or more inches, etc.

The conveyer 200 can include a plurality of different portions with one or more configurations. For example, FIG. 2B is a schematic diagram depicting an example curved portion 250 of the conveyor 200 with motorized and non-motorized conveyor rollers in accordance with various embodiments of the present disclosure is provided. The example curved portion 250, for example, can include a curved section of the conveyer 200.

As depicted in FIG. 2B, the example curved portion 250 of the conveyor 200 can include one or more motorized conveyor rollers, e.g., motorized conveyor roller 252 and one or more non-motorized conveyor rollers, e.g., non-motorized conveyor roller 254. The conveyor 200 can include at least a first rail 256 and a second rail 258. As depicted in FIG. 2, the plurality of motorized conveyor rollers and non-motorized conveyor rollers (e.g., motorized conveyor roller 252 and non-motorized conveyor roller 254) are mechanically/operatively coupled to the first rail 256 and the second rail 258. In some embodiments, the first rail 256 and the second rail 258 can include one or more sets of apertures configured to receive the plurality of motorized conveyor rollers and non-motorized conveyor rollers (e.g., motorized conveyor roller 252 and non-motorized conveyor roller 254).

The example portion 250 can be configured as a curved section of the conveyer 200 in the which the first rail 256 and the second rail 258 include at least partially curved rails. The first rail 256 and the second rail 258 can be curved at any angle such as, for example, a 90-degree angle, etc. The curved section can include a tapered conveyor roller 255 to help items maintain their position on a conveyer as they are transported by the conveyer 200. The tapered conveyor roller 255, for example, can include a first end 260 with a first dimension and a second end 265 opposite to the first end 260 with a second dimension different from the first dimension. The second end 265, for example, can include a larger diameter than the diameter of the first end 260. By way of example, the first end 260 can include a first diameter (e.g., one or more centimeters, inches, etc.) and the second end 265 can include second diameter (e.g., one or more centimeters, inches, etc.) that is larger than the first diameter.

The first diameter and the second diameter can reference an inner diameter of a conveyor roller, an outer diameter of the conveyor roller, or both. For example, in some embodiments, the first diameter and the second diameter can reference the outer diameter at a respective side of the conveyor roller. The outer diameter, for example, can include the length of a line through a center axis of the conveyor roller that touches two points on the outermost exterior surface of the conveyor roller. As illustrated herein, the outermost exterior surface can include an exterior surface of a cylindrical housing of the conveyor roller.

While FIGS. 2A-B depicts an example conveyor 200, it is noted that the scope of the present disclosure is not limited to the examples shown in FIGS. 2A-B. An example conveyor 200 in accordance with the present disclosure can comprise one or more additional and/or alternative elements, and/or can be different from that illustrated in FIG. 2A-B.

Conventional conveyers can utilize one type of conveyer rollers (e.g., motorized conveyor roller 202 and non-motorized conveyor roller 204) with constant dimensions (e.g., a constant diameter) at a straight-line portion 225 of the conveyer and a second type of conveyer rollers (e.g., motorized conveyor roller 252 and non-motorized conveyor roller 254) with a different set of constant dimensions (e.g., a set of diameters) at curved portions 250 of the conveyer. Accordingly, a plurality of different types of conveyer rollers may be used for different sections of a conveyor frame which results in fixed conveyor setups without flexibility. This requires maintenance of multiple stooking units, tooling, assembly setups, etc. and increases inventory necessary for different conveyer configurations. A reconfigurable motorized conveyer is therefore advantageous.

Figure 3:
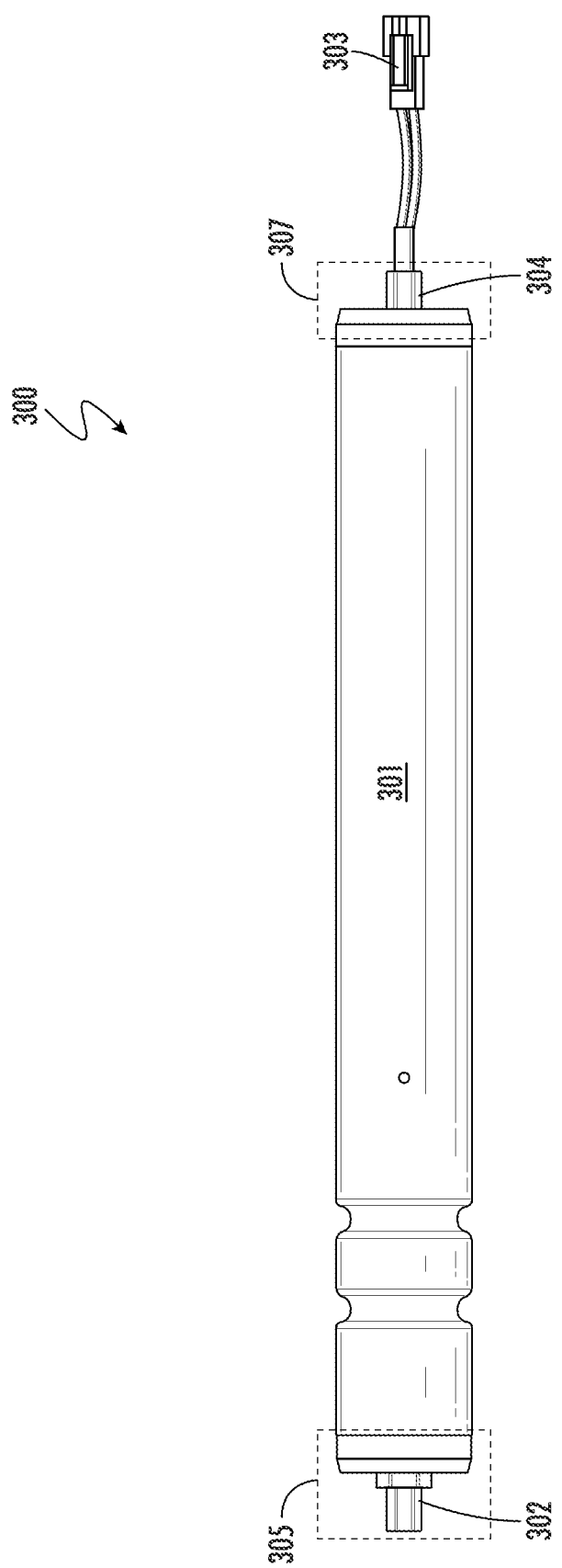
FIG. 3 illustrates an example integrated motorized conveyor roller in accordance with various embodiments of the present disclosure.

Referring now to FIG. 3, a schematic diagram depicting a perspective view of an example integrated motorized conveyor roller 300 in accordance with various embodiments of the present disclosure is provided. In various embodiments, the example integrated motorized conveyor roller 300 can be part of a conveyor/conveyor system (e.g., the conveyor 200 described above in connection with FIGS. 2A-B) and can be configured to drive one or more non-motorized conveyor rollers that are operatively coupled thereto. The conveyor/conveyor system can be part of an automated or semi-automated warehousing system in which objects can be stored, retrieved, conveyed, and/or the like in response to system instructions and/or user interactions via a computing entity (such as the user computing entity 108 described above in connection with FIG. 1). For example, the example integrated motorized conveyor roller 300 can be configured to convey objects along at least a portion of a conveyor based at least in part on system instructions.

As depicted in FIG. 3, the example integrated motorized conveyor roller 300 comprises a housing 301 (e.g., roller tube) configured to contain one or more components/elements of the integrated motorized conveyor roller 300 (e.g., a controller component, as discussed in further detail below). In some examples, the housing 301 (e.g., roller tube) of the integrated motorized conveyor roller 300 comprises a hollow cylindrical body and can comprise metal, plastic, combinations thereof, and/or the like. As discussed herein, the cylindrical body can include an expandable body.

As further illustrated in FIG. 3, the example integrated motorized conveyor roller 300 comprises a first end cap 305 defining a first end/surface of the example integrated motorized conveyor roller 300. As depicted, the first end cap 305 comprises a first appendage 302 configured to be operatively coupled to a conveyor (e.g., disposed between a first rail and a second rail, such as within an aperture of the first rail).

Additionally, as depicted, the example integrated motorized conveyor roller 300 comprises a second end cap 307 defining a second end/surface of the example integrated motorized conveyor roller 300. As depicted, the second end cap 307 comprises a second appendage 304 configured to be operatively coupled to a conveyor (e.g., disposed between a first rail and a second rail, such as within an aperture of the second rail). As further depicted in FIG. 3, the integrated motorized conveyor roller 300 comprises a power cable 303 disposed adjacent the second end cap 307 that is configured to be connected to a power supply. Additionally, and/or alternatively, the power cable 303 can also be configured to provide a connection for data transfer.

Figure 4:
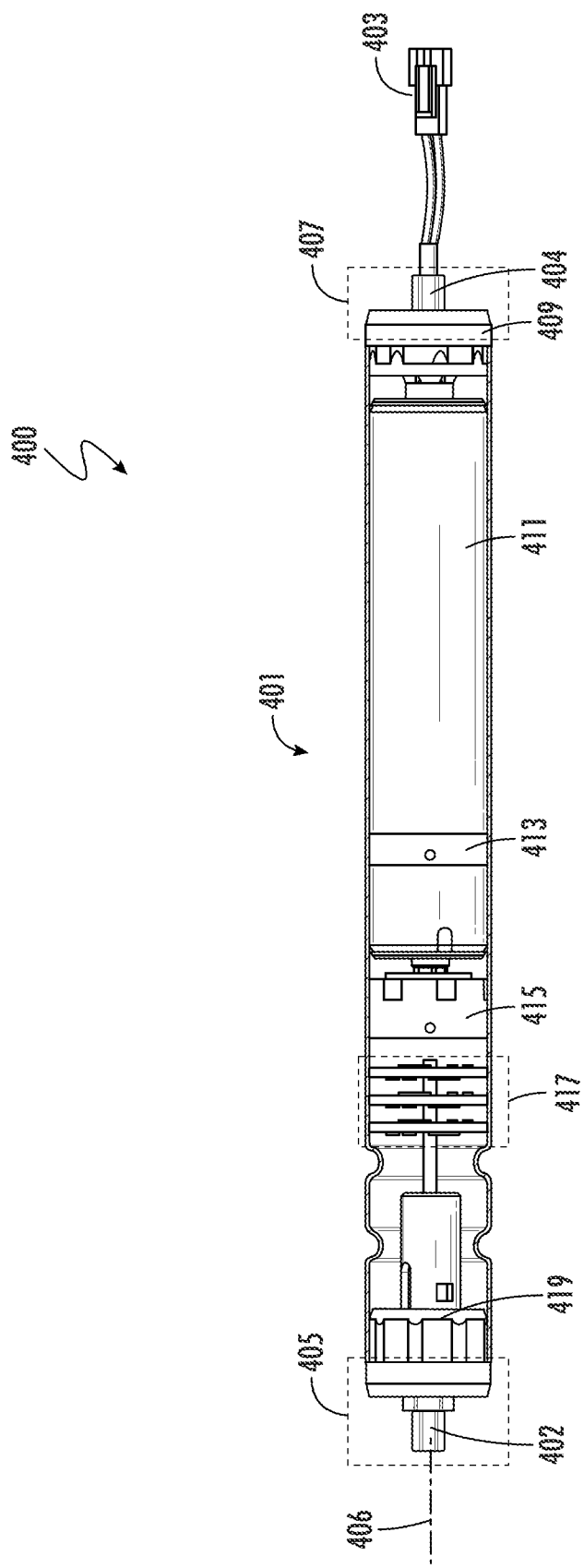
FIG. 4 illustrates a side section view of an example integrated motorized conveyor roller in accordance with various embodiments of the present disclosure.

Referring now to FIG. 4, a schematic diagram depicting a side section view of an example integrated motorized conveyor roller 400 in accordance with various embodiments of the present disclosure is provided. The example integrated motorized conveyor roller 400 can be similar or identical to the integrated motorized conveyor roller 300 discussed above in connection with FIG. 3. The example integrated motorized conveyor roller 400 can be part of a conveyor/conveyor system and can be configured to drive one or more non-motorized conveyor rollers that are operatively coupled thereto. The example integrated motorized conveyor roller 400 can be configured to convey objects along at least a portion of a conveyor based at least in part on system instructions and/or user interactions via a computing entity (such as the user computing entity 108 described above in connection with FIG. 1). As illustrated in FIG. 4, the example integrated motorized conveyor roller 400 comprises a power cable 403, a first end cap 405, a second end cap 407, a motor assembly 411, a load sensor 413, a drive assembly 415, a controller component 417 and a bearing assembly 419. In various embodiments, the elements/components of the integrated motorized conveyor roller 400 (e.g., the motor assembly 411, the load sensor 413 and the drive assembly 415) are in electronic communication with the controller component 417 such that they can exchange data/information with one another.

As noted above, and as depicted in FIG. 4, the example integrated motorized conveyor roller 400 comprises a housing 401 (e.g., roller tube) configured to contain one or more components/elements of the integrated motorized conveyor roller 300. In particular, as depicted, the example integrated motorized conveyor roller 400 is configured to contain at least the motor assembly 411, the load sensor 413, the drive assembly 415, the controller component 417 and the bearing assembly 419. In various examples, the housing 401 (e.g., roller tube) of the integrated motorized conveyor roller 400 comprises a hollow cylindrical body and can comprise metal, plastic, combinations thereof, and/or the like.

As further illustrated in FIG. 4, the example integrated motorized conveyor roller 400 comprises a first end cap 405 defining a first end/surface of the example integrated motorized conveyor roller 400. As depicted, the first end cap 405 comprises a first appendage 402 configured to be operatively coupled to a conveyor (e.g., disposed between a first rail and a second rail, such as within an aperture of the first rail).

As noted above, and as depicted in FIG. 4, the example integrated motorized conveyor roller 400 can include one or more of a motor assembly 411, a drive assembly 415 and a bearing assembly 419 that operate to drive/rotate the housing 401 (e.g., roller tube) of the integrated motorized conveyor roller 400 with respect to a central axis 406 of the integrated motorized conveyor roller 400. In some embodiments, each of the motor assembly 411 and the drive assembly 415 are at least partially disposed within the housing 401 (e.g., roller tube) of the integrated motorized conveyor roller 400. For example, as shown, at least a surface of the motor assembly 411 and at least a surface of the drive assembly 415 can be in contact with an inner surface of the housing 401 (e.g., roller tube) of the integrated motorized conveyor roller 400. In some embodiments, the housing 401 can include multiple sections. The at least one surface of the motor assembly 411 and the drive assembly 415 can be in contact at least one section (e.g., an inner section), while an outer section may be reconfigured without disrupting the functions of the motor assembly 411 and the drive assembly 415.

The drive assembly 415 can be configured to transfer torque from the motor assembly 411 to the housing 401 (e.g., roller tube) of the integrated motorized conveyor roller. Additionally, as illustrated, the example integrated motorized conveyor roller 400 comprises a bearing assembly 419 configured to, in conjunction with the motor assembly 411 and drive assembly 415, facilitate rotation of the integrated motorized conveyor roller 400 about the central axis 406. As shown, the bearing assembly 419 is disposed adjacent and operatively coupled to the first end cap 405 of the integrated motorized conveyor roller 400. In some embodiments, the drive assembly 415 can be fixed relative to the housing 401 (e.g., roller tube), while the motor assembly 411 is fixed relative to a frame supporting the roller tube, such that the motor assembly 411 can rotate the drive assembly 415 and the roller tube.

As further depicted, the example integrated motorized conveyor roller 400 comprises a second end cap 407 defining a second end/surface of the example integrated motorized conveyor roller 300. As depicted, the second end cap 407 comprises a second appendage 404 configured to be operatively coupled to a conveyor (e.g., disposed between a first rail and a second rail, such as within an aperture of the second rail). As noted above, the integrated motorized conveyor roller 400 comprises a power cable 403 disposed adjacent the second end cap 407 that is configured to be connected to a power supply. In some embodiments, the second end cap 407 comprises a light emitting diode (LED) element 409 that is configured to provide a visual alert in response to a detected condition of the integrated motorized conveyor roller 400.

In some embodiments, as further depicted in FIG. 4, the example integrated motorized conveyor roller 400 comprises a load sensor 413. As shown, the load sensor 413 is disposed within the housing 401 (e.g., roller tube) of the integrated motorized conveyor roller 400 between the motor assembly 411 and the drive assembly 415. The load sensor 413 is configured to determine a weight of an object disposed on at least a portion of the integrated motorized conveyor roller 400, such as by converting a weight of an object into a measurable electrical signal. For example, as an object moves along a conveyor and is incident on the motor assembly 411, the load sensor 413 can generate a measurable electrical signal (e.g., voltage output) corresponding with a weight of the object. In various embodiments, the load sensor 413 can be or comprise one or more strain gauges, piezoelectric sensors and/or the like.

As noted above, and as depicted in FIG. 4, the integrated motorized conveyor roller 400 comprises a controller component 417. As depicted, the controller component 417 can be at least partially disposed within the housing 401 (e.g., roller tube) of the integrated motorized conveyor roller 400. As depicted, the controller component 417 is disposed between the bearing assembly 419 and the drive assembly 415. In various embodiments, the controller component 417 can be or comprise one or more printed circuit boards (PCBs). For example, as depicted, the controller component 417 comprises a PCB stack comprising three PCBs configured to be in electronic communication with one another. In various embodiments, the controller component 417 comprises a controller module that is configured to control operations of the motor assembly 411, drive assembly 415, load sensor 413 and/or the like. In some embodiments, the controller component 417 comprises a wireless module that is configured to provide a communication interface (e.g., Bluetooth, Bluetooth Low Energy (BLE), low-power wide-area network such as Long Range (LoRa), and/or the like) between the integrated motorized conveyor roller 400 and one or more other motorized conveyor rollers. Additionally, in some embodiments, the controller component 417 comprises a power module that is configured to control operations of electronic elements (e.g., circuitry, sensing element and/or the like) of the integrated motorized conveyor roller 400.

While FIG. 4 depicts an example integrated motorized conveyor roller 400, it is noted that the scope of the present disclosure is not limited to the examples shown in FIG. 4. An example integrated motorized conveyor roller 400 in accordance with the present disclosure can comprise one or more additional and/or alternative elements, and/or can be different from that illustrated in FIG. 4. For example, a motorized conveyor roller in accordance with the present disclosure can include adjustable components to modify the dimensions of the motorized conveyor roller for use in different sections of a conveyor frame.

FIG. 5A, for example, provides a schematic diagram depicting a reconfigurable motorized conveyor roller 500 in accordance with various embodiments of the present disclosure. The reconfigurable motorized conveyor roller 500 can be similar to the integrated motorized conveyor rollers 300 and 400 discussed above in connection with FIGS. 3 and 4. For instance, the reconfigurable motorized conveyor roller 500 can be part of a conveyor/conveyor system and can be configured to drive one or more non-motorized conveyor rollers that are operatively coupled thereto. The reconfigurable motorized conveyor roller 500 can be configured to convey objects along at least a portion of a conveyor based at least in part on system instructions and/or user interactions via a computing entity (such as the user computing entity 108 described above in connection with FIG. 1).

The reconfigurable motorized conveyor roller 500 comprises a reconfigurable housing configured to include and/or contain one or more components/elements of the integrated motorized conveyor rollers 300 and 400 of FIGS. 3 and 4. For instance, the reconfigurable housing can include an at least partially hollow body, a first end cap defining a first end/surface of the reconfigurable housing, a first appendage configured to be operatively coupled to a conveyor (e.g., disposed between a first rail and a second rail, such as within an aperture of the first rail), a second end cap defining a second end/surface of the housing, and/or a second appendage configured to be operatively coupled to a conveyor (e.g., disposed between a first rail and a second rail, such as within an aperture of the second rail), as described herein with reference to the example integrated motorized conveyor roller 300 of FIG. 3. In addition, or alternatively, the reconfigurable motorized conveyor roller 500 can include any one of the power cable, first end cap, second end cap, motor assembly, load sensor, drive assembly, controller component and/or bearing assembly as described herein with reference to the example integrated motorized conveyor roller 400 of FIG. 4.

As depicted, the reconfigurable motorized conveyor roller 500 can be converted between a plurality of configurations including, for example, a straight configuration 525 and a tapered configuration 550. The straight configuration 525 can include a straight housing 505 with a constant diameter across the length of the straight housing 505. The tapered configuration 550 can include a tapered housing 510 with a tapered diameter across the length of the tapered housing 510.

For example, the reconfigurable housing of the reconfigurable motorized conveyor roller 500 can include a first end/surface and a second end/surface opposite to the first end/surface.

The straight housing 505 can include a first end/surface 502 with first dimensions 515 and a second end/surface 504 with second dimensions 525. In the straight configuration 525, the first dimensions 515 and the second dimensions 525 can include a constant and/or the same diameter. This can form the straight housing 505 with a constant diameter across the length of the straight housing 505.

The tapered housing 510 can include a first end/surface 502 with first dimensions 520 and a second end/surface 504 with second dimensions 530. In the tapered configuration 550, the first dimension 520 and the second dimension 530 can include different diameters. By way of example, the second dimension 530 can include a larger diameter than the first dimension 520. This can form the tapered housing 510 with a tapered diameter across the length of the tapered housing 510.

The reconfigurable housing can be converted from the straight housing 505 to the tapered housing 510 by increasing the diameter of the reconfigurable housing at the first end/surface 502 relative to the second end/surface 504 and/or increasing the diameter of the reconfigurable housing at the second end/surface 504 relative the first end/surface 502. The reconfigurable housing can be converted from the tapered housing 510 to the straight housing 505 by decreasing the diameter of the reconfigurable housing at the first end/surface 502 to achieve the same and/or similar diameter of the second end/surface 504 and/or decreasing the diameter of the reconfigurable housing at the second end/surface 504 to achieve the same and/or similar diameter of the first end/surface 502.

The reconfigurable motorized conveyor roller 500 can include a housing adjustment assembly disposed within the housing that is operable to modify one or more dimensions of the reconfigurable housing. The housing adjustment assembly can be disposed proximate to the first end/surface 502, the second end/surface 504, or both to modify a diameter of the reconfigurable housing at the first end/surface 502, the second end/surface 504, or both.

For instance, the housing adjustment assembly 575 can be disposed at a first position 555 proximate to the first end/surface 502 and can be operable to modify the diameter of the housing at the first end/surface 502. In addition, or alternatively, the housing adjustment assembly 575 can be disposed at a second position 560 proximate to the second end/surface 504 and can be operable to modify the diameter of the housing at the second end/surface 504.

As one example, the housing adjustment assembly can be disposed at the second position 560 and can be operable to increase the diameter of the housing at the second end/surface 504 to form the tapered housing 510. As another example, the housing adjustment assembly 575 can be disposed at the second position 560 and can be operable to decrease the diameter of the housing at the second end/surface 504 to form the straight housing 505.

Figure 5B:
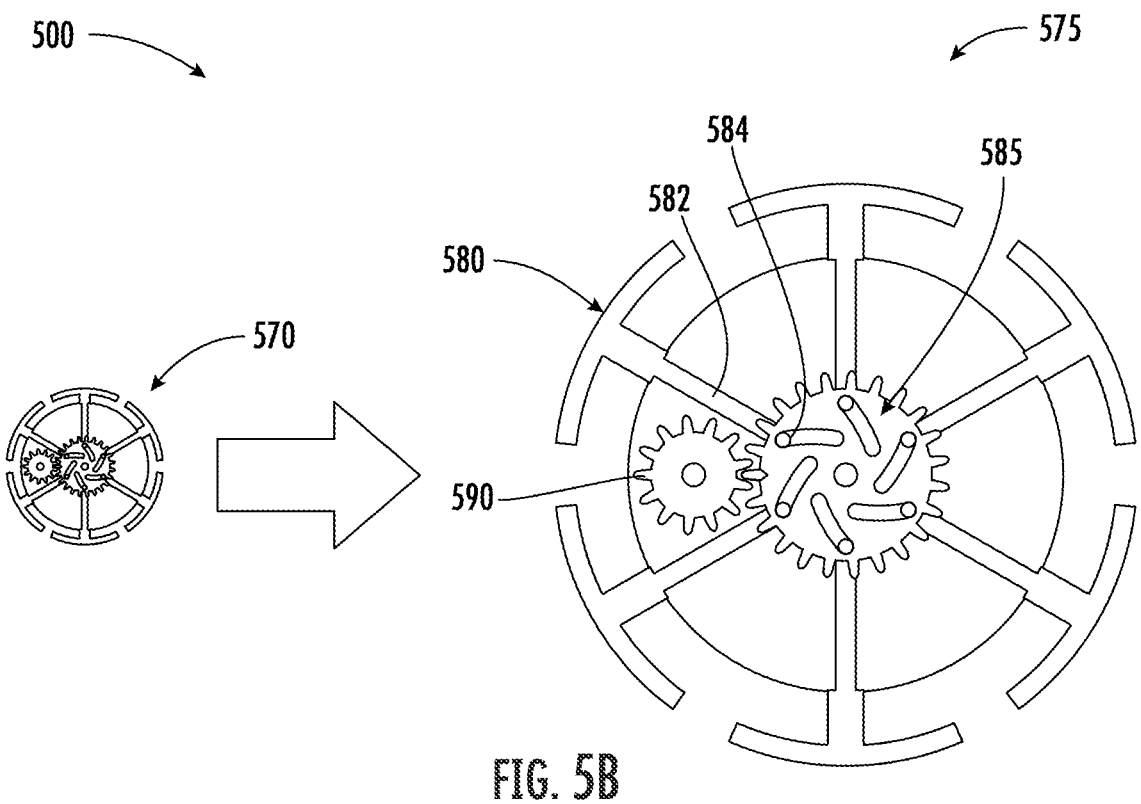
FIG. 5B illustrates an example housing adjustment assembly integrated within a reconfigurable housing of the reconfigurable motorized conveyor roller in accordance with various embodiments of the present disclosure.

FIG. 5B illustrates cross-section side views of an example housing adjustment assembly integrated within a reconfigurable housing of the reconfigurable motorized conveyor roller 500 in accordance with various embodiments of the present disclosure. FIG. 5B depicts a first cross-section side view and a second cross-section view. The first cross-section view depicts a housing adjustment assembly and reconfigurable housing in a contracted state 570. The second cross-section view depicts the housing adjustment assembly and reconfigurable housing in an expanded state 575.

The reconfigurable housing can include an expandable material and/or can include a plurality of separate sections that can expand and contract to modify the diameter of at least a portion of the reconfigurable housing.

For instance, in example embodiments, the reconfigurable housing can include a plurality of curved plates such as curved plate 580 that at least partially form a cylindrical tube. The plurality of curved plates can be separable to expand the diameter of the reconfigurable housing (e.g., from the contracted state 570 to the expanded state 575). In some embodiments, the plurality of curved plates can be at least partially covered by a sleeve. The sleeve, for example, can include an elastic material that can expand and compress around the exterior surface of the housing. In addition, or alternatively, the expandable sleeve can include a removable conveyer roller cover, sleeve, etc. that can be fitted to exterior of the reconfigurable housing.

Figure 5C:
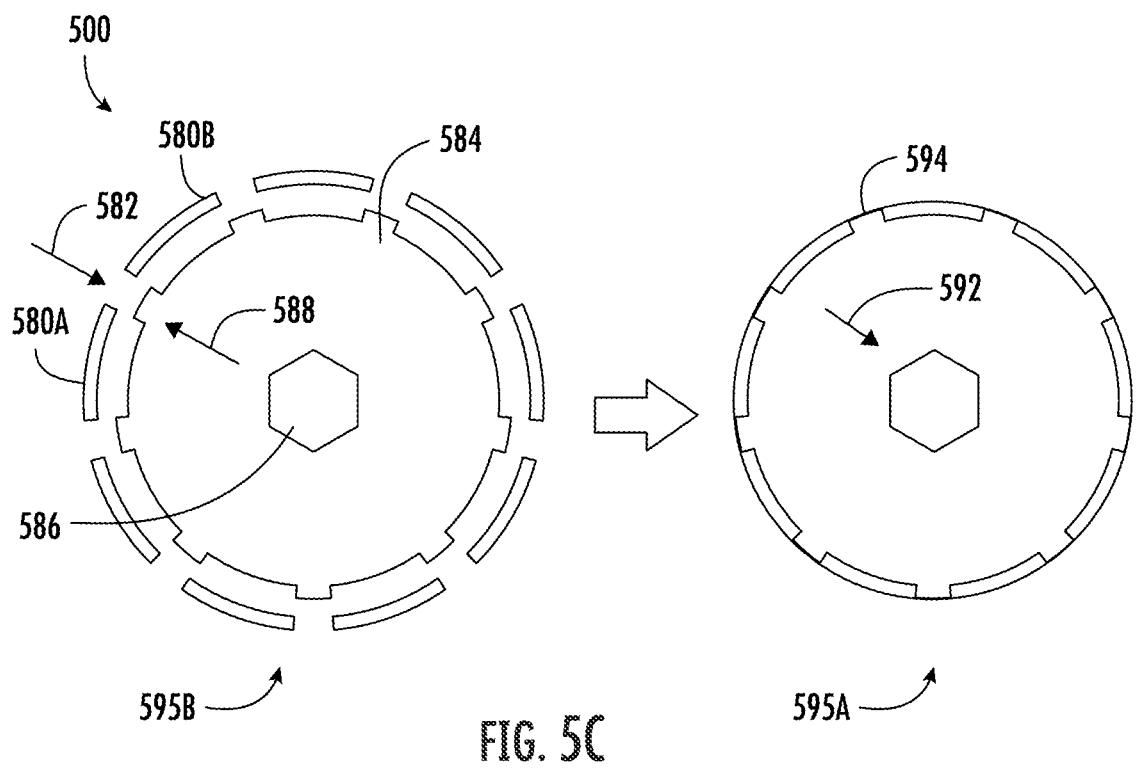
FIG. 5C illustrates a cross-section side view of an example reconfigurable housing in accordance with various embodiments of the present disclosure.

As an example, FIG. 5C depicts a cross-section side view of an example reconfigurable housing of a reconfigurable motorized conveyor roller 500 in accordance with various embodiments of the present disclosure. The reconfigurable housing can be reconfigured between an expanded state 595B and a contracted state 595A (and any dimensions there between). As describe herein, the reconfigurable housing can include a plurality of curved plates such as curved plates 580A and 580B. Each of the curved plates can be separated by a respective surface gap of the reconfigurable housing. For example, the curved plate 580A can be separated from the curved plate 580B by a surface gap 582. As depicted, the curved plates can be moved in a direction 588 out from a center axis 586 of the reconfigurable motorized conveyor roller 500 to expand the diameter of the reconfigurable housing (and width of the surface gap 582 accordingly). In addition, or alternatively, the curved plates can be moved in a direction 592 in towards the center axis 586 of the reconfigurable motorized conveyor roller 500 to compress the diameter of the reconfigurable housing (and width of the surface gap 582 accordingly).

In some embodiments, the reconfigurable motorized conveyor roller 500 can contract to a full tube design (e.g., with no surface gaps) in which the curved plates fit together with no surface gaps therebetween. In addition, or alternatively, as shown in the contracted state 595A, the reconfigurable motorized conveyor roller 500 can contract to a partial tube design with at least one surface gap between each of the curved plates. As described above, the surface gaps can be covered, in some embodiments, by an expandable sleeve.

In some embodiments, the reconfigurable housing include an inner tube 584 disposed therein. The inner tube 584 can include plastic, metal, or any other material cylindrical tube disposed within the reconfigurable housing. The inner tube 584 can include a plurality of prominences such as prominence 594 outwardly (e.g., relative to the center axis 586) protruding from the exterior surface of the inner tube 584. Each prominence can be configured to fit to a respective surface gap when the reconfigurable housing is a contracted state 595A as shown.

The inner tube 584 can include a solid cylindrical tube or an at least partially hollow cylindrical tube. For example, while described with reference to motorized conveyor rollers (e.g., such as motorized conveyor roller 202 of FIG. 2) for illustrative purposes, the techniques and mechanisms described can be equally applicable to non-motorized conveyor rollers (e.g., non-motorized conveyor roller 204 of FIG. 2). In some embodiments, the inner tube 584 can include a solid cylindrical tube when implemented in a non-motorized conveyor roller. In some embodiments, the inner tuber 584 can include an at least partially hollow cylindrical tube when implemented in a motorized conveyor roller. In this manner, components described herein with reference to the motorized rollers can be disposed within the inner tube 584.

Turning back to FIG. 5B, the housing adjustment assembly can be employed in the reconfigurable motorized conveyor roller 500 to cause the plurality of curved plates to expand and/or compress to convert the configuration of the reconfigurable motorized conveyor roller 500.

The housing adjustment assembly 575 can include a cam slotted gear 585 and a drive gear 590. The cam slotted gear 585 and the drive gear 590 can be disposed within the reconfigurable housing. Each curved plate of the plurality of curved plates (e.g., curved plate 580) can include and/or be coupled or attached to a respective plate rod (e.g., plate rod 582). The respective plate rod (e.g., plate rod 595) can be coupled, attached, affixed, fitted, etc. to a respective cam slot (e.g., cam slot 584) of the cam slotted gear 585.

The cam slotted gear 585 can be fit to a drive gear 590 that is configured to cause rotation of the cam slotted gear 585 to increase or decrease a diameter of the at least a portion of the reconfigurable housing. For example, the drive gear 590 can be rotated to cause a corresponding rotation of the cam slotted gear 585. The cam slotted gear 585 can be rotated to convert between the contracted state 570 and the expanded state 575. Rotating the cam slotted gear 585 can cause each of the respective plate rods and their corresponding curved plates to move to expand and/or compress the diameter of at least a portion of the reconfigurable housing. In this manner, different configurations of a reconfigurable motorized conveyor roller 500 can be dynamically achieved from a single design.

In some embodiments, the drive gear 590 can be operatively coupled to an actuator. The actuator can cause the drive gear 590 to rotate automatically. For example, as discussed with reference to FIG. 4, the reconfigurable motorized conveyor roller 500 can include a motor assembly and a drive assembly at least partially disposed within the housing that are configured to cause rotation of at least a portion of the reconfigurable motorized conveyor roller. In some embodiments, the drive gear 590 is operatively coupled to the motor assembly and the motor assembly can be configured to rotate the drive gear 590 to cause the rotation of the cam slotted gear 585.

In some embodiments, an actuator can cause the drive gear 590 to automatically rotate in response to a stimulus (e.g., user input, etc.). For example, in some embodiments, as discussed with reference to FIG. 4, the reconfigurable motorized conveyor roller 500 can include a controller component in electronic communication with the motor assembly, the drive assembly, and/or the housing adjustment assembly. In some embodiments, the controller component can be configured to cause the rotation of the drive gear 590 responsive to an input such as, for example, a user input.

The housing adjustment assembly can be employed in the reconfigurable motorized conveyor roller 500 for manually and/or automatically controlling the configuration of the reconfigurable motorized conveyor roller 500 to help form different sections of a conveyor line. In some embodiments, for example where the conveyor line includes a fixed frame, the reconfigurable motorized conveyor roller 500 can be controlled to change a configuration during the assembly process for a conveyor line. In addition, or alternatively, the reconfigurable motorized conveyor roller 500 can be controlled to dynamically change a configuration during use of the assembly line.

Figure 5D:
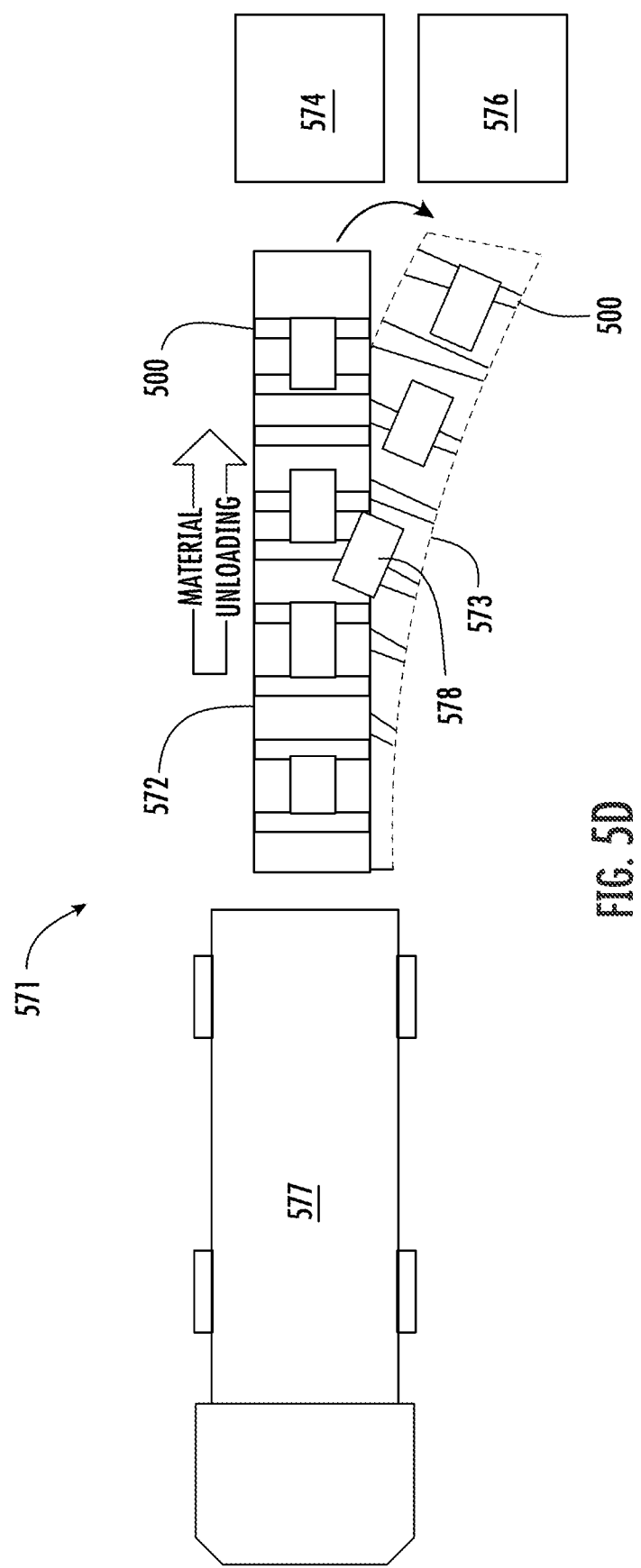
FIG. 5D illustrates a flexible conveyor line using example motorized conveyor rollers in accordance with various embodiments of the present disclosure.

For example, FIG. 5D illustrates a flexible conveyor line 571 using example motorized conveyor rollers 500 in accordance with various embodiments of the present disclosure. The flexible conveyor line 571 can be reconfigured in different arrangements to modify a path of items 578 being transported by the flexible conveyor line 571.

For example, the flexible conveyor line 571 can include a flexible frame. The flexible conveyor line 571 can be dynamically changed between (i) a straight configuration 572 with a plurality of motorized conveyor rollers 500 in a straight configuration 525 and/or (ii) one or more curved configurations 573 in which a plurality of motorized conveyor rollers 500 are in various tapered configurations 550. The flexible conveyor line 571 can be dynamically changed between each configuration by modifying the configurations of the motorized conveyor rollers included in the flexible conveyor line 571.

In this manner, motorized conveyor rollers 500 in a flexible conveyor frame can be configured in a straight or tapered shape with respect to the desired destination (e.g., a first bay 574, a second bay 576) of an item 578. This dynamic property of the motorized conveyor rollers 500 allows one flexible conveyor line 571 to be used to unload and/or load containers (e.g., such as a tractor container 577) to/from multiple areas such as, for example, the first bay 574 and the second bay 576. The configuration of the flexible conveyor line 571 can be dynamically changed while the conveyor line is running to dynamically alter an end destination for the items 578.

While FIGS. 5A-D depict an example reconfigurable motorized conveyor roller 500, it is noted that the scope of the present disclosure is not limited to the examples shown in FIGS. 5A-D. An example reconfigurable motorized conveyor roller 500 in accordance with the present disclosure can comprise one or more additional and/or alternative elements, and/or can be different from that illustrated in FIGS. 5A-D.

By way of example, although not explicitly shown in FIGS. 5A-D, it should be noted that the housing adjustment assembly can be disposed at multiple positions within the reconfigurable housing. For instance, multiple housing adjustment assemblies can be disposed within the reconfigurable housing such as, for example, at the first position 555 and the second position 560. The multiple housing adjustment assemblies can be advantageous to enable variable diameters at each side of the reconfigurable housing. The multiple adjustment assemblies can be simultaneously adjusted to uniformly increase and/or decrease a diameter of the reconfigurable motorized conveyor roller 500 in a straight configuration 525 or a tapered configuration 550.

Figure 6:
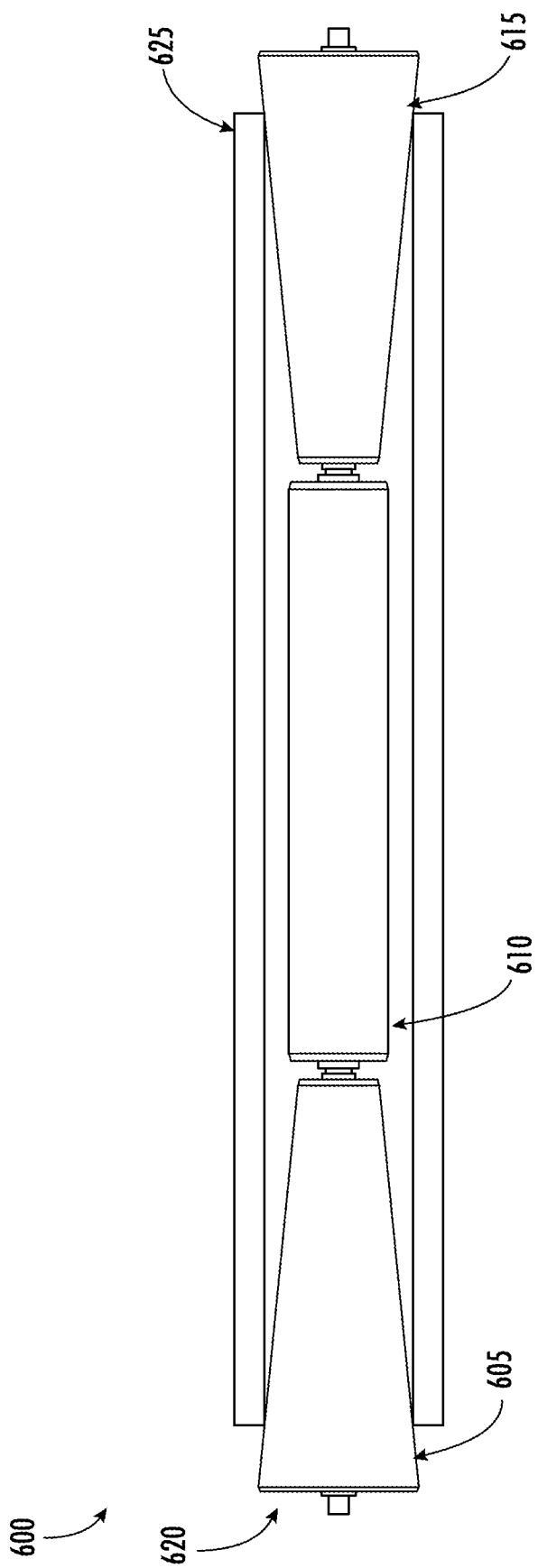
FIG. 6 illustrates an example modular reconfigurable conveyor roller in accordance with various embodiments of the present disclosure.

In addition, or alternatively, multiple reconfigurable motorized conveyor rollers 500 can be attached to create one or more different modular configurations. FIG. 6, for example, provides a schematic diagram depicting a modular reconfigurable motorized conveyor roller 600 in accordance with various embodiments of the present disclosure. The modular reconfigurable motorized conveyor roller 600 can include multiple reconfigurable motorized conveyor rollers 605, 610, and 615 that can be connected to form an aggregate motorized conveyor roller 620. In some embodiments, the modular reconfigurable motorized conveyor roller 600 can include a roller belt 625 disposed thereon. Using the techniques described herein, the aggregate motorized conveyor roller 620 can be adjusted to maintain enough intact between aggregate motorized conveyor roller 620 and the roller belt 625 to prevent belt slip due low tension between aggregate motorized conveyor roller 620 and the roller belt 625.

While FIG. 6 depicts an example modular reconfigurable motorized conveyor roller 600, it is noted that the scope of the present disclosure is not limited to the examples shown in FIG. 6. An example modular reconfigurable motorized conveyor roller 600 in accordance with the present disclosure can comprise one or more additional and/or alternative elements, and/or can be different from that illustrated in FIG. 6.

Figure 7:
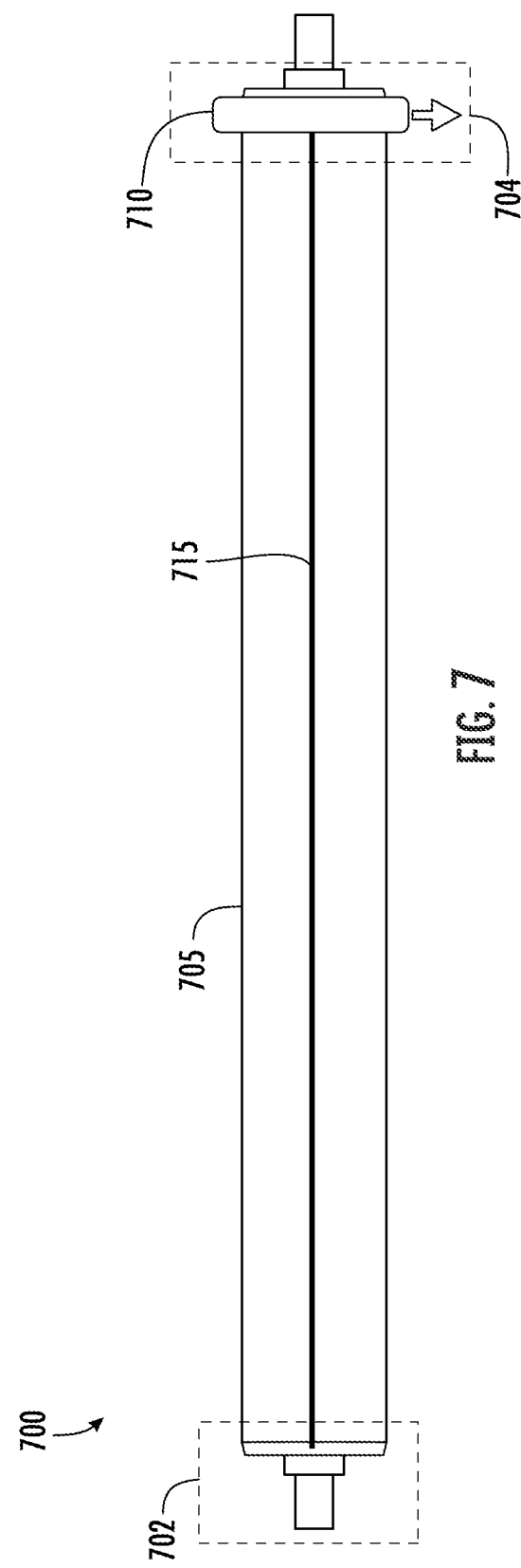
FIG. 7 illustrates an example shoe integrated motorized conveyor roller in accordance with various embodiments of the present disclosure.

FIG. 7 illustrates an example shoe integrated motorized conveyor roller 700 in accordance with various embodiments of the present disclosure. The shoe integrated motorized conveyor roller 700 can be similar the reconfigurable motorized conveyor roller 500 discussed above in connection with FIGS. 5A-D. For instance, the shoe integrated motorized conveyor roller 700 can be part of a conveyor/conveyor system and can be configured to drive one or more non-motorized conveyor rollers that are operatively coupled thereto. The shoe integrated motorized conveyor roller 700 can be configured to convey objects along at least a portion of a conveyor based at least in part on system instructions and/or user interactions via a computing entity (such as the user computing entity 108 described above in connection with FIG. 1).

The shoe integrated motorized conveyor roller 700 can include a housing 705. The housing 705 can include the reconfigurable housing of the reconfigurable motorized conveyor roller 500 discussed above in connection with FIGS. 5A-D. In addition, or alternatively, the housing 705 can include a different housing. For example, the housing 705 can include a non-configurable housing with a hollow cylindrical body and can comprise a solid metal, plastic, and/or combinations thereof.

The housing 705 can be configured to include and/or contain one or more components/elements of the reconfigurable motorized conveyor roller 500. For instance, the reconfigurable housing can include an at least partially hollow body, a first end cap defining a first end/surface of the reconfigurable housing, a first appendage configured to be operatively coupled to a conveyor (e.g., disposed between a first rail and a second rail, such as within an aperture of the first rail), a second end cap defining a second end/surface of the housing, and/or a second appendage configured to be operatively coupled to a conveyor (e.g., disposed between a first rail and a second rail, such as within an aperture of the second rail), as described herein with reference to the example integrated motorized conveyor roller 300 of FIG. 3. In addition, or alternatively, the housing 705 can include any one of the power cable, first end cap, second end cap, motor assembly, load sensor, drive assembly, controller component and/or bearing assembly as described herein with reference to the example integrated motorized conveyor roller 400 of FIG. 4. In some embodiments, the housing 705 can include the housing adjustment assembly as described herein with reference to the example reconfigurable motorized conveyor roller 500 of FIG. 5.

The shoe integrated motorized conveyor roller 700 can include an integrated shoe sorter assembly 710. The integrated shoe sorter assembly 710 can include a shoe slider component (partially shown in FIG. 7) at least partially disposed on an exterior surface of the housing 705 and a shoe adjustment component (not shown in FIG. 7) disposed within the housing 705 that is operable to modify a position of the shoe slider component relative to the housing 705. For instance, the shoe slider component can be moveable between the first end 702 and the second end 704 of the housing 705.

In some embodiments, the shoe slider component can be connected to the shoe adjustment component through a surface gap 715 of the housing 705. The housing 705, for example, can include at least one surface gap 715. By way of example, the housing can include a plurality of curved plates as described herein with reference to the example reconfigurable motorized conveyor roller 500 of FIG. 5. In some embodiments, the housing can include a plurality of surface gaps (e.g., surface gap 715) including at least one surface gap between each of the plurality of curved plates. The shoe slider component can be connected to the shoe adjustment component through at least one surface gap (e.g., surface gap 715) of the housing 705.

In addition, or alternatively, the shoe slider component can be connected to the shoe adjustment component through the surface of the housing 705, for example, using one or more magnetic mechanisms to create a connection through a solid material.

While FIG. 7 depicts an example shoe integrated motorized conveyor roller 700, it is noted that the scope of the present disclosure is not limited to the examples shown in FIG. 7. An example integrated shoe sorter assembly 710 in accordance with the present disclosure can comprise one or more additional and/or alternative elements, and/or can be different from that illustrated in FIG. 7.

Figure 8A:
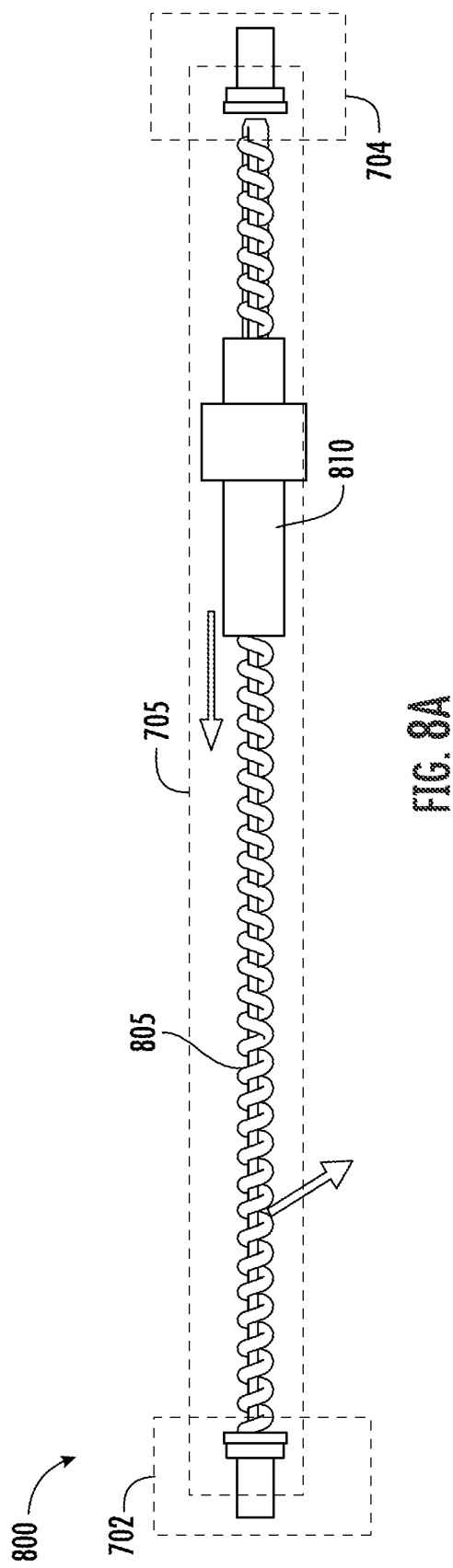
FIGS. 8A-B illustrate an example integrated shoe sorter assembly in accordance with various embodiments of the present disclosure.
Figure 8B:
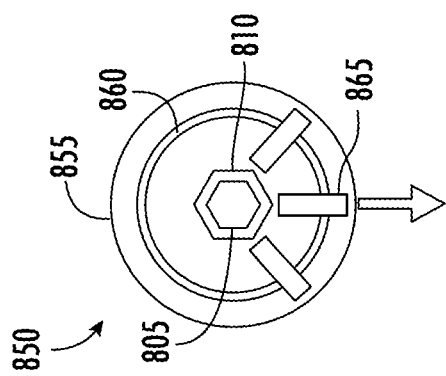

Turning to FIGS. 8A-B, FIGS. 8A-8B illustrate an example integrated shoe sorter assembly 710 in accordance with various embodiments of the present disclosure. FIG. 8A depicts an example shoe adjustment component 800 in accordance with various embodiments of the present disclosure. FIG. 8B depicts an example shoe slider component 850 in accordance with various embodiments of the present disclosure. For ease of explanation, the shoe adjustment component 800 and the shoe slider component 850 are discussed herein with reference to the shoe integrated motorized conveyor roller 700 discussed above in connection with FIG. 7. The shoe adjustment component 800 and the shoe slider component 850 are not limited to shoe integrated motorized conveyor roller 700 and can be integrated with any conveyor roller (e.g., drive conveyer rollers, non-drive conveyor rollers, etc.).

As depicted, the example shoe adjustment component 800 can include a lead screw 805. The lead screw 805 can include a mechanical linear actuator that converts rotational motion into linear motion. The lead screw 805 is provided as one embodiment of the shoe adjustment component 800. The shoe adjustment component 800 can include any other mechanism capable of causing linear motion for an object such as, for example, one or more solenoids, linear motors, or any other mechanism.

The lead screw 805 can be disposed within the housing 705 of the shoe integrated motorized conveyor roller 700 and extend linearly along the length of the housing 705. For instance, the lead screw 805 can linearly extend from the first end 702 to the second 704 of the housing 705. The lead screw 805 can be disposed in one or more alternative positions within the housing 705 including, for example, at a central axis of the housing 705 of the housing 705, an offset center of the housing 705 including a threshold distance from the central axis of the housing 705, etc. In some embodiments, the shoe adjustment component 800 can include a plurality of lead screws (or other linear actuating mechanism) disposed at each of a plurality of positions within the housing 705.

The shoe adjustment component 800 can include the lead screw 805 extending along the length of the housing 705 and a nut 810 coupled to the lead screw 805. The nut 810 can be include interior threads compatible with exterior threads of the lead screw 805 such that rotation of the lead screw 805 causes the nut 810 to move in a direction relative to the length of the housing 705. For instance, the rotation of the lead screw 805 can linearly move the nut 810 between the first end 702 and the second end 704 of the housing. The lead screw 850 can be rotated independent of the movement of the housing 705.

The example shoe slider component 850 can include an exterior ring 855 that, at least partially, encircles the exterior surface 860 of the housing 705. In some embodiments, the exterior ring 855 can include an expandable ring that encircles the exterior surface 860 of the housing 705. This can be advantageous to allow the housing 705 to expand and compress in accordance with various embodiments of the present disclosure.

The example shoe slider component 850 can be attached, affixed, coupled, etc. to the shoe adjustment component 800. As one example, the exterior ring 855 of the shoe slider component 850 can be attached to one or more connecting links (e.g., connecting link 865) and the one or more connecting links can be attached to the nut 810 of the shoe adjustment component 800. The connecting links (e.g., connecting link 865) can cause the exterior ring 855 to linearly move with the nut 810 of the shoe adjustment component 800.

In some embodiments, the lead screw 805 can be operatively coupled to an actuator. The actuator can cause the lead screw 805 to rotate automatically. For example, as discussed with reference to FIG. 4, the shoe integrated motorized conveyor roller 700 can include a motor assembly and a drive assembly at least partially disposed within the housing 705 that are configured to cause rotation of at least a portion of the shoe integrated motorized conveyor roller 700. In some embodiments, the lead screw 805 can be operatively coupled to the motor assembly and the motor assembly can be configured to rotate the lead screw 805 to cause the nut 810 to move linearly along the length of the housing. It is noted that the lead screw 850 is rotated independent of the rotation of the housing 705. The lead screw 810 can be stationary while the housing 705 is rotating or can be rotating at a faster or slower rate than the rotation of the housing 705. The lead screw 805 can be rotated while the housing 705 is stationary.

In some embodiments, an actuator can cause the lead screw 805 to automatically rotate in response to a stimulus (e.g., user input, etc.). For example, in some embodiments, as discussed with reference to FIG. 4, the shoe integrated motorized conveyor roller 700 can include a controller component in electronic communication with the motor assembly, the drive assembly, and/or the integrated shoe sorter assembly 710. In some embodiments, the controller component can be configured to cause the rotation the lead screw 805 responsive to an input such as, for example, a user input.

While FIGS. 8A-B depict an example integrated shoe sorter assembly 710, it is noted that the scope of the present disclosure is not limited to the examples shown in FIGS. 8A-B. An example integrated shoe sorter assembly 710 in accordance with the present disclosure can comprise one or more additional and/or alternative elements, and/or can be different from that illustrated in FIGS. 8A-B.

Figure 9:
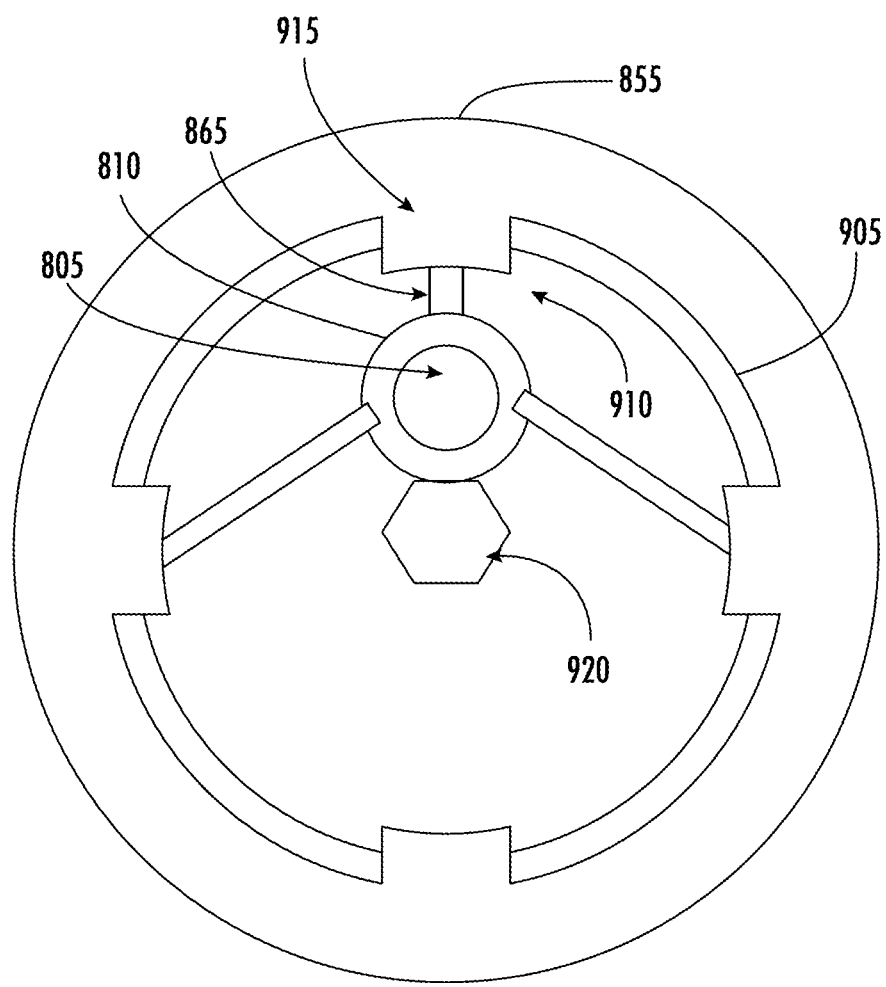
FIG. 9 illustrates a cross-section side view of an example integrated shoe sorter assembly in accordance with various embodiments of the present disclosure.

FIG. 9 provides a schematic diagram depicting a cross-section side view of an example integrated shoe sorter assembly 900 in accordance with various embodiments of the present disclosure. In some embodiments, the integrated shoe sorter assembly 900 can be integrated in a reconfigurable motorized conveyor roller with a reconfigurable housing as discussed herein with reference to FIG. 5. The housing can include a plurality of separate sections that can expand and contract to modify the diameter of at least a portion of the reconfigurable housing. For instance, in example embodiments, the reconfigurable housing can include a plurality of curved plates such as curved plate 905 that at least partially form a cylindrical tube. The each of the plurality of curved plates can be separated by a respective surface gap such as surface gap 910.

The housing can include a surface gap 910 between at least two of the plurality of curved plates. The exterior ring 855 can include a prominence 915 extending through housing. The prominence 915 can be fitted within the surface gap 910. In some embodiments, the housing can include a plurality of surface gaps (e.g., surface gap 910). The exterior ring 855 can include one or a plurality of prominences (e.g., prominence 915) corresponding to one or more of the surface gaps. In some embodiments, the exterior ring 855 can include a plurality of prominences that include a respective prominence fitted to each respective surface gap.

The exterior ring 855 can be attached to the nut 810 of the shoe adjustment component by a connecting link 865 attached to the prominence 915 fitted within the surface gap 910. In some embodiments, the exterior ring 855 can be attached to the nut 810 by a plurality of connecting links (e.g., connecting link 865). For instance, the plurality connecting links can include a respective connecting link for one or more of the prominences of the exterior ring 855.

The nut 810 can be coupled to the lead screw 810 disposed within the interior of the housing. The lead screw 810 can be positioned at one or more positions within the housing. For instance, the lead screw 810 can be positioned at an offset center of the housing interior. The offset center of the housing interior can include a threshold distance from a center shaft 920 disposed within the housing. The center shaft 920, for example, can be disposed along a center axis of the housing and the lead screw 810 can be positioned a threshold distance from the center axis.

While FIG. 9 depicts an example integrated shoe sorter assembly 900, it is noted that the scope of the present disclosure is not limited to the examples shown in FIG. 9. An example integrated shoe sorter assembly 900 in accordance with the present disclosure can comprise one or more additional and/or alternative elements, and/or can be different from that illustrated in FIG. 9.

Figure 10:
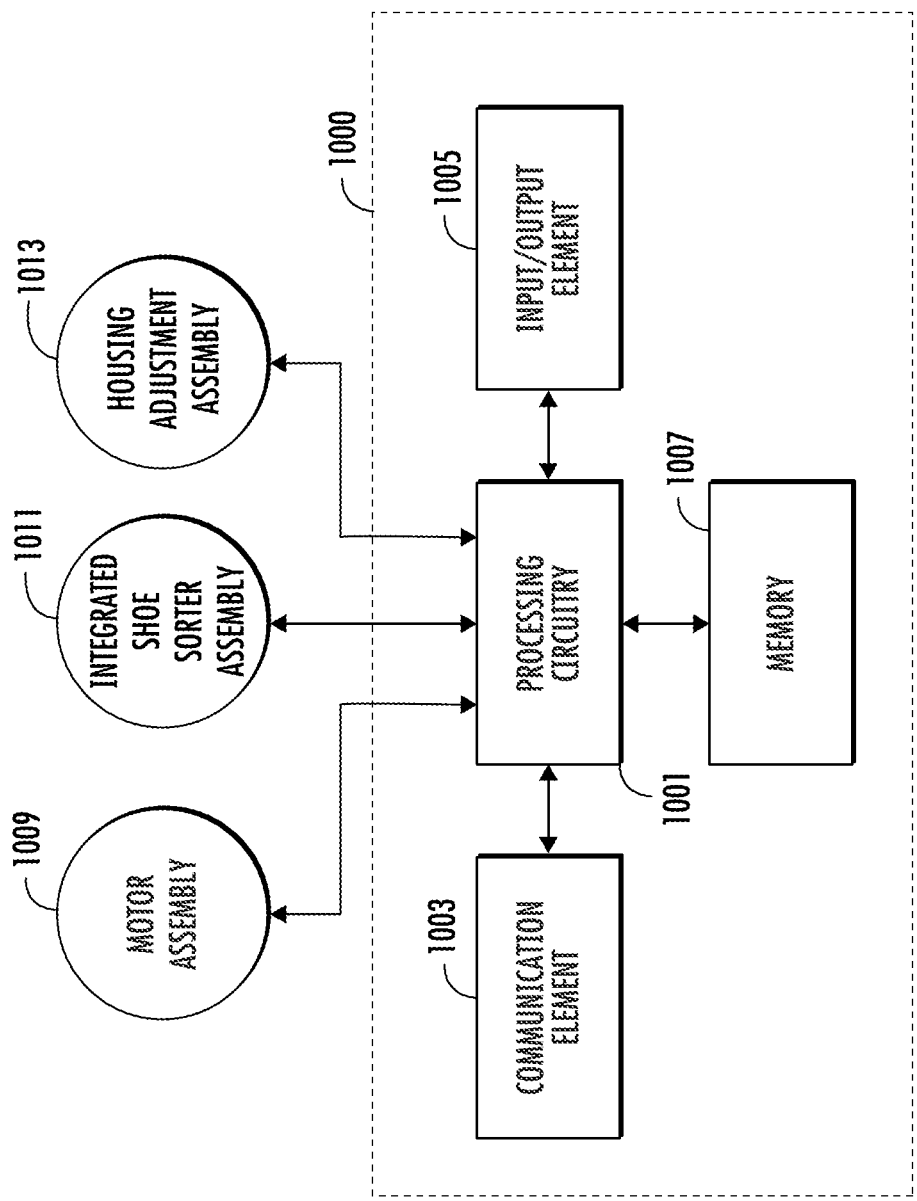
FIG. 10 illustrates an example controller component in electronic communication with various other components of an example integrated motorized conveyor roller in accordance with various embodiments of the present disclosure.

Referring now to FIG. 10, a schematic diagram depicting an example controller component 1000 in electronic communication with a motor assembly 1009, integrated shoe sorter assembly 1011 and housing adjustment assembly 1013 of a motorized conveyor roller in accordance with various embodiments of the present disclosure is provided. As shown, the controller component 1000 comprises processing circuitry 1001, a communication element 1003, input/output element 1005, a memory 1007 and/or other components configured to perform various operations, procedures, functions or the like described herein.

In some embodiments, the controller component 1000 can be or comprise a printed circuited board (PCB). In some examples, the controller component 1000 (e.g., PCB) can further comprise one or more of a full bridge motor driver, a hall sensor, one or more thermal sensors, one or more user interfaces, one or more protection circuits, configuration management circuitry, a wireless interface, sensing element circuitry (e.g., image sensor circuitry), an interface connector, power control circuitry, gate driver circuitry and/or the like.

The processing circuitry 1001 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 10 as a single processor, in an embodiment, the processing circuitry 1001 can include a plurality of processors and signal processing modules. The plurality of processors can be embodied on a single electronic device or can be distributed across a plurality of electronic devices collectively configured to function as the circuitry of the motorized conveyor roller. The plurality of processors can be in operative communication with each other and can be collectively configured to perform one or more functionalities of the circuitry of the motorized conveyor roller as described herein. In an example embodiment, the processing circuitry 1001 can be configured to execute instructions stored in the memory 1007 or otherwise accessible to the processing circuitry 1001. These instructions, when executed by the processing circuitry 1001, can cause the circuitry of the motorized conveyor roller to perform one or more of the functionalities, as described herein.

Whether configured by hardware, firmware/software methods, or by a combination thereof, the processing circuitry 1001 can include an entity capable of performing operations according to embodiments of the present disclosure while configured accordingly. Thus, for example, when the processing circuitry 1001 is embodied as an ASIC, FPGA or the like, the processing circuitry 1001 can include specifically configured hardware for conducting one or more operations described herein. Additionally, or alternatively, when the processing circuitry 1001 is embodied as an executor of instructions, such as can be stored in the memory 1007, the instructions can specifically configure the processing circuitry 1001 to perform one or more algorithms and operations described herein.

Thus, the processing circuitry 1001 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 1007 can include suitable logic, circuitry, and/or interfaces that are adapted to store a set of instructions that is executable by the processing circuitry 1001 to perform predetermined operations. Additionally, or alternately, the memory 1007 can be configured to store data/information, application programs, instructions, etc., so that the controller component 1000 can execute various functions according to the embodiments of the present disclosure. For example, in at least some embodiments, the memory 1007 is configured to cache input data for processing by the processing circuitry 1001. Thus, in at least some embodiments, the memory 1007 is configured to store program instructions for execution by the processing circuitry 1001. The memory 1007 can store information in the form of static and/or dynamic information. When the functions are executed, the stored information can be stored and/or used by the controller component 1000. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 1007 can be integrated with the processing circuitry 1001 on a single chip, without departing from the scope of the disclosure.

The communication element 1003 can be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 1007) and executed by a processing component 1000 (for example, the processing circuitry 1001). In some embodiments, the communication element 1003 (as with other components discussed herein) can be at least partially implemented as the processing circuitry 1001 or otherwise controlled by the processing circuitry 1001. In this regard, the communication element 1003 can communicate with the processing circuitry 1001, for example, through a bus. The communication element 1003 can comprise, for example, antennas, transmitters, receivers, transceivers, network interface cards and/or supporting hardware and/or firmware/software, and is used for establishing communication with another apparatus. The communication element 1003 can be configured to receive and/or transmit any data that can be stored by the memory 1007 by using any protocol that can be used for communication between apparatuses. The communication element 1003 can additionally or alternatively communicate with the memory 1007, the input/output element 1005 and/or any other component of the processing component 1000, for example, through a bus.

In some embodiments, the processing component 1000 can comprise an input/output element 1005. The input/output element 1005 can communicate with the processing circuitry 1001 to receive instructions input by the user and/or to provide audible, visual, mechanical, or other outputs to the user. Therefore, the input/output element 1005 can comprise supporting devices, such as a keyboard, a mouse, a display, a touch screen display, and/or other input/output mechanisms. Alternatively, at least some aspects of the input/output element 1005 can be implemented on a device used by the user to communicate with the processing component 1000. The input/output element 1005 can communicate with the memory 1007, the communication element 1003 and/or any other component, for example, through a bus. One or a plurality of input/output modules and/or other components can be included in the processing component 1000.

Figure 11:
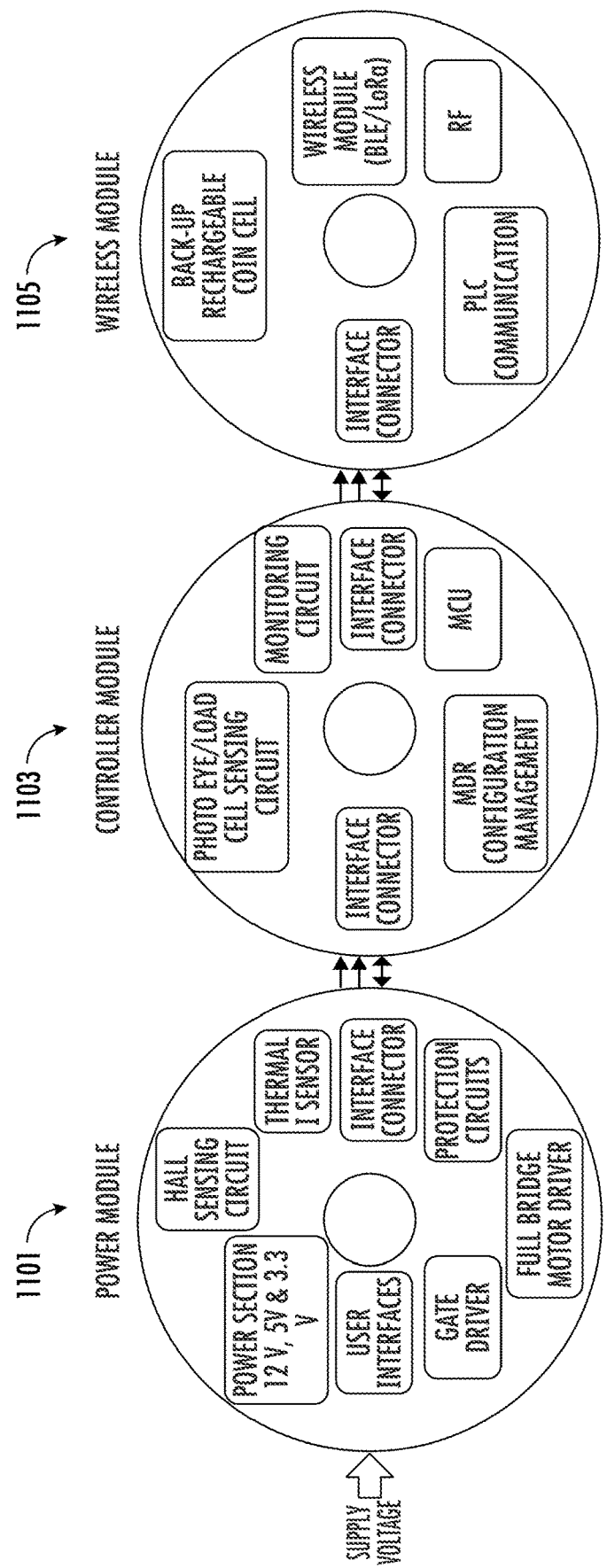
FIG. 11 illustrates an example controller component in accordance with various embodiments of the present disclosure.

Referring now to FIG. 11, a schematic diagram depicting an example controller component 1100 of an integrated motorized conveyor roller in accordance with various embodiments of the present disclosure is provided. In some examples, the controller component 1100 can be similar or identical to the controller component 417 described above in connection with FIG. 4.

In some embodiments, as depicted, the controller component 1100 can be or comprise a PCB stack comprising a plurality of PCBs in electronic communication with one another via interface connectors. In particular, as depicted, the controller component 1100 comprises a power module 1101, a controller module 1103 and a wireless module 1105.

As depicted in FIG. 11, the power module 1101 comprises a first PCB configured to control operations of electronic elements of the motorized conveyor roller. In the depicted embodiment, the power module 1101 is configured to receive/condition a power supply and comprises one or more of a Hall sensing circuit, a thermal sensor, interface connector(s), one or more protection circuits, a full bridge motor driver, a gate driver, one or more user interfaces and a power section.

As noted above, the controller component 1100 comprises a controller module 1103. The controller module 1103 comprises a second PCB that is configured to control various operations of the integrated motorized conveyor roller. In the depicted embodiment, the controller module 1103 comprises at least one sensing element (e.g., photo eye) circuit, interface connector(s), a micro controller unit (MCU) and a motorized conveyor roller configuration management circuit.

As noted above, the controller component 1100 comprises a wireless module 1105. The wireless module 1105 comprises a third PCB that is configured to provide a communication interface (e.g., Bluetooth, BLE, LoRa, and/or the like). For example, between the integrated motorized conveyor roller and one or more other motorized conveyor rollers.

As further depicted in FIG. 11, the wireless module 1105 comprises a power supply (e.g., back-up rechargeable coin cell) a BLE and/or LoRa interface, a communication element, a monitoring circuit and interface connector(s).

In some embodiments, as depicted in FIG. 11, the controller component 1100/motorized conveyor roller can comprise a monitoring circuit for monitoring operations and/or operational conditions of the integrated motorized conveyor roller (e.g., providing self-check functionality) via one or more sensing elements. By way of example, a monitoring circuit of the controller component 1100 can be operatively coupled to a magnetic sensing element (e.g., an inductor or transformer). During operations, the rotation of the integrated motorized conveyor roller motor assembly generates a magnetic field which in turn generates a measurable electrical signal (e.g., voltage output) across the magnetic sensing element coupled thereto. An output of a comparator circuit can be used to provide an output describing one or more parameters associated with motorized conveyor roller (e.g., a lifetime motor operational time, number of rotations, loading conditions, vibrational information, installation issues, belt wear out, and/or the like). In some embodiments, at least a portion of the output of the comparator circuit can be measured and stored in memory. In some examples, the controller component 1100 can provide a control indication to actuate an LED element in response to detecting certain conditions (e.g., complete loss of motor function or overload scenario). In various embodiments, the controller component 1100 can be operatively coupled to other types of sensing elements including pressure sensors, vibrational sensors, temperature sensors, position sensors, and/or the like.

In various embodiments, the controller component 1100 can store (e.g., periodically and/or in response to requests) information/data describing various operational parameters of the integrated motorized conveyor roller including lifetime motor operational time, object information (e.g., information describing presence/absence of an object and/or other characteristics, image data or the like).

While FIG. 11 depicts an example controller component 1100 (e.g., PCB stack), it is noted that the scope of the present disclosure is not limited to the example shown in FIG. 11. An example controller component 1100 in accordance with the present disclosure can comprise one or more additional and/or alternative elements, and/or can be different from that illustrated in FIG. 11. For example, an integrated motorized conveyor roller in accordance with the present disclosure can comprise a single PCB or more than three PCBs.

Figure 12:
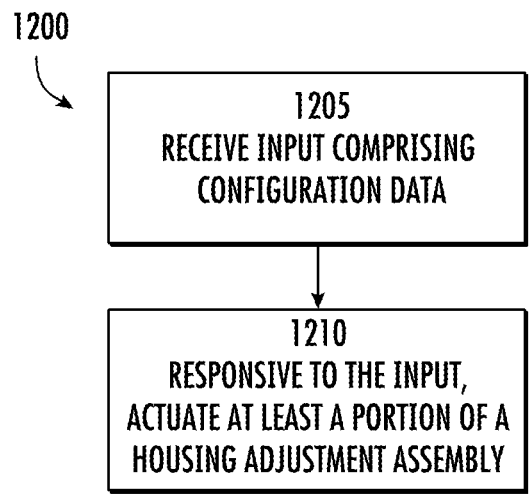
FIG. 12 is a flowchart diagram illustrating example operations in accordance with various embodiments of the present disclosure.

Referring now to FIG. 12, a flowchart diagram illustrating example operations 1200 in accordance with various embodiments of the present disclosure is provided. In some examples, the example operations 1200 can be performed by various system components (for example, but not limited to, processing circuitry of a computing entity 106 described above with regard to FIG. 1). The system components can be or comprise a central server. In some examples, the system components can include processing circuitry that can be electrically coupled to and/or in electronic communication with other circuitries, such as, but not limited to, one or more motorized conveyor rollers (such as, for example, the integrated motorized conveyor roller 400, the reconfigurable motorized conveyor roller 500, modular reconfigurable conveyor roller 600, shoe integrated motorized conveyor roller 700, described above in connection with FIGS. 5-8).

The example operations 1200 can include an operation 1205. At operation 1205, the processing circuitry can receive input comprising configuration data. In some embodiments, the configuration data can identify a desired configuration for a motorized conveyor roller. The configuration data, for example, can indicate a taper configuration, a straight configuration, and/or any other configuration for a conveyor roller. In some embodiments, the configuration data can include instructions to increase and/or decrease a dimension (e.g., a diameter) of at least a portion a housing of the reconfigurable motorized conveyor roller. The configuration data can include manual input received from an operator of a conveyor system.

The example operations 1200 can include an operation 1210. At operation 1210, the processing circuitry can cause, by the controller component and based at least in part on the configuration data, a movement (e.g., a rotation, etc.) of at least a portion of a housing adjustment assembly of the motorized roller to modify one or more dimensions of a housing of the motorized roller. For example, the controller component can interface with an actuator to cause a rotation (or other movement) of at least the portion of the housing adjustment assembly. The actuator can include a motor such as, for example, a motor assembly integrated with the motorized conveyor roller. In addition, or alternatively, the actuator can include another motor assembly.

Figure 13:
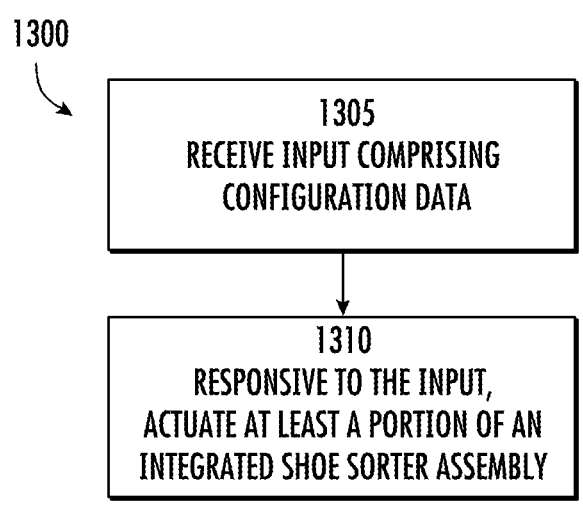
FIG. 13 is a flowchart diagram illustrating example operations in accordance with various embodiments of the present disclosure.

Referring now to FIG. 13, a flowchart diagram illustrating example operations 1300 in accordance with various embodiments of the present disclosure is provided. In some examples, the example operations 1300 can be performed by various system components (for example, but not limited to, processing circuitry of a computing entity 106 described above with regard to FIG. 1). The system components can be or comprise a central server. In some examples, the system components can include processing circuitry that can be electrically coupled to and/or in electronic communication with other circuitries, such as, but not limited to, one or more motorized conveyor rollers (such as, for example, the integrated motorized conveyor roller 400, the reconfigurable motorized conveyor roller 500, modular reconfigurable conveyor roller 600, shoe integrated motorized conveyor roller 700, described above in connection with FIGS. 5-8).

The example operations 1300 can include an operation 1305. At operation 1305, the processing circuitry can receive input comprising configuration data. The configuration data, for example, can identify a desired movement for an integrated shoe sorter assembly of a motorized conveyor roller. The configuration data can specify a position for an exterior shoe of the shoe shorter assembly, a desired movement for the exterior shoe, a timing for the desired movement, and/or any other information associated with the movement of the integrated shoe sorter assembly. The configuration data can include manual input received from an operator of a conveyor system.

The example operations 1300 can include an operation 1310. At operation 1310, the processing circuitry can cause, by the controller component and based at least in part on the configuration data, at least a portion of the integrated shoe sorter assembly of the motorized conveyor roller to cause a movement of a shoe slider component along an exterior of the housing of the motorized conveyor roller. For example, the controller component can interface with an actuator to cause the rotation (or other movement) of at least the portion of the integrated shoe sorter assembly. The actuator can include a motor such as, for example, a motor assembly integrated with the motorized conveyor roller. In addition, or alternatively, the actuator can include another motor assembly.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A reconfigurable motorized conveyor roller comprising:
   a housing comprising a first end and a second end opposite to the first end, wherein the housing comprises a plurality of curved plates that at least partially form a cylindrical tube, wherein the plurality of curved plates is configured to move in a direction along a center axis of the reconfigurable motorized conveyor roller and the plurality of curved plates is partially covered by a sleeve; and
   a housing adjustment assembly disposed within the housing that is operable to modify one or more dimensions of the housing, wherein the housing adjustment assembly comprises a cam slotted gear and a drive gear, and wherein a curved plate of the plurality of curved plates comprises a plate rod that is fitted to a cam slot of the cam slotted gear.

2. The reconfigurable motorized conveyor roller of claim 1, wherein the sleeve comprises an elastic material that can expand and compress around an exterior surface of the housing.

3. The reconfigurable motorized conveyor roller of claim 1, wherein the housing adjustment assembly is disposed proximate to the second end and is operable to increase or decrease a diameter of the housing at the second end to form a tapered housing.

4. The reconfigurable motorized conveyor roller of claim 1, wherein the housing adjustment assembly further comprises an inner tube, wherein the inner tube comprises a plurality of prominences protruding outwardly from an exterior surface of the inner tube.

5. The reconfigurable motorized conveyor roller of claim 4, wherein the drive gear is configured to cause a rotation of the cam slotted gear to increase or decrease a diameter of at least a portion of the housing.

6. The reconfigurable motorized conveyor roller of claim 5, further comprising:
   a motor assembly and a drive assembly at least partially disposed within the housing that are configured to cause rotation of at least a portion of the reconfigurable motorized conveyor roller, wherein the drive gear is operatively coupled to the motor assembly, and wherein the motor assembly is configured to rotate the drive gear to cause the rotation of the cam slotted gear.

7. The reconfigurable motorized conveyor roller of claim 6, further comprising:
   a controller component in electronic communication with the motor assembly, the drive assembly, and the housing adjustment assembly, wherein the controller component is configured to cause a rotation of the drive gear.

8. The reconfigurable motorized conveyor roller of claim 1, wherein the reconfigurable motorized conveyor roller further comprises an integrated shoe sorter assembly.

9. The reconfigurable motorized conveyor roller of claim 8, wherein the integrated shoe sorter assembly comprises:
   a shoe slider component at least partially disposed on an exterior surface of the housing; and
   a shoe adjustment component disposed within the housing that is operable to modify a position of the shoe slider component relative to the housing.

10. The reconfigurable motorized conveyor roller of claim 9, wherein the shoe slider component is moveable between the first end and the second end of the housing.

11. The reconfigurable motorized conveyor roller of claim 9, wherein the shoe slider component comprises an exterior ring that encircles the exterior surface of the housing.

12. The reconfigurable motorized conveyor roller of claim 11, wherein the housing comprises a surface gap between at least two of the plurality of curved plates, and wherein the exterior ring comprises a prominence fitted within the surface gap.

13. The reconfigurable motorized conveyor roller of claim 12, wherein the shoe adjustment component is attached by a connecting link to the prominence fitted within the surface gap.

14. The reconfigurable motorized conveyor roller of claim 9, wherein the shoe adjustment component comprises a lead screw linearly extending along a length of the housing and a nut coupled to the lead screw.

15. The reconfigurable motorized conveyor roller of claim 14, wherein the shoe slider component is attached to the nut.

16. The reconfigurable motorized conveyor roller of claim 14, wherein rotation of the lead screw causes the nut to linearly move in a direction relative to the length of the housing.

17. The reconfigurable motorized conveyor roller of claim 16, further comprising:
   a motor assembly and a drive assembly at least partially disposed within the housing that are configured to cause rotation of at least a portion of the reconfigurable motorized conveyor roller, wherein the lead screw is operatively coupled to the motor assembly, and wherein the motor assembly is configured to rotate the lead screw to cause the nut to move linearly.

18. The reconfigurable motorized conveyor roller of claim 17, wherein the lead screw is rotated independent of the housing.

19. The reconfigurable motorized conveyor roller of claim 17, further comprising:
   a controller component in electronic communication with the motor assembly, the drive assembly, and the integrated shoe sorter assembly, wherein the controller component is configured to cause the rotation of the lead screw.

* * * * *